US012604342B2

(12) United States Patent
Bhattacharya et al.

(10) Patent No.: US 12,604,342 B2
(45) Date of Patent: Apr. 14, 2026

(54) INTRA-BAND ENHANCED MULTILINK SINGLE-RADIO COMMUNICATION

(71) Applicant: QUALCOMM Incorporated, San Diego, CA (US)

(72) Inventors: Abhijit Bhattacharya, Bangalore (IN); Arul Durai Murugan Palanivelu, Bangalore (IN); Suresh Chandrasekaran, Kanchipuram (IN); Vinod Belur Ramachandra, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 18/328,482

(22) Filed: Jun. 2, 2023

(65) Prior Publication Data

US 2024/0406999 A1 Dec. 5, 2024

(51) Int. Cl.
*H04W 74/0816* (2024.01)
*H04W 74/0833* (2024.01)

(52) U.S. Cl.
CPC ..... *H04W 74/0816* (2013.01); *H04W 74/085* (2013.01)

(58) Field of Classification Search
CPC ........................ H04W 74/0816; H04W 74/085
See application file for complete search history.

(56) References Cited

U.S. PATENT DOCUMENTS

| | | | |
|---|---|---|---|
| 2015/0326419 A1* | 11/2015 | Mayer-Zintel | ...... H04L 27/2653 |
| | | | 455/141 |
| 2017/0085406 A1* | 3/2017 | Li | ........................ H04L 27/2603 |
| 2021/0051650 A1* | 2/2021 | Yi | ........................ H04W 72/21 |
| 2022/0029736 A1* | 1/2022 | Chu | ...................... H04L 1/0025 |
| 2023/0379999 A1 | 11/2023 | Kim et al. | |

FOREIGN PATENT DOCUMENTS

WO      WO-2022164293 A1      8/2022

OTHER PUBLICATIONS

Adhikari S., et al., "Analysis of Multilink in IEEE 802.11be", IEEE communications Standards Magazine, IEEE, vol. 6, No. 3, Sep. 1, 2022, pp. 52-58, XP011924670 (Year: 2022).*
Adhikari S., et al., "Analysis of Multilink in IEEE 802.11be", IEEE Communications Standards Magazine, IEEE, vol. 6, No. 3, Sep. 1, 2022, pp. 52-58, XP011924670, Section "Different Multilink Modes in 802.11BE", p. 1-p. 2, figure 2 Section "If the link have other competing devices", p. 3 section "Simulation based evaluation of multilink modes in 802.11BE", p. 4, table 1.

(Continued)

*Primary Examiner* — Siming Liu
(74) *Attorney, Agent, or Firm* — Norton Rose Fulbright US LLP

(57) ABSTRACT

This disclosure provides methods, components, devices and systems for intra-band enhanced multilink single-radio (eMLSR) communication. Some aspects more specifically relate to independently contending, using a single radio, for access on first and second links associated with first and second primary subchannels of a channel. A packet may then be transmitted, using the single radio, over a one of the first link or the second link on which contention is won.

30 Claims, 15 Drawing Sheets

1200

1202

Independently contend, using a single radio, for access on each of a first link associated with a first primary sub-channel of a first channel and a second link associated with a second primary sub-channel of the first channel

1204

Transmit, using the single radio, a first packet to a second wireless communication device over a one of the first link or the second link on which the contention is won

(56)          References Cited

OTHER PUBLICATIONS

International Search Report and Written Opinion—PCT/US2024/
028159—ISA/EPO—Aug. 19, 2024.
Park M (Intel Corp)., et al., "Enhanced Multi-link Single Radio
Operation", IEEE Draft, 11-20-0562-07-00BE-Enhanced-Multi-
Link-Single-Radio-Operation, IEEE-SA Mentor, Piscataway, NJ
USA, vol. 802.11 EHT, 802.11be, No. 7, Jul. 17, 2020, pp. 1-28,
XP068170112, p. 4-p. 5 p. 12-p. 13 p. 17-p. 22.

* cited by examiner

1200

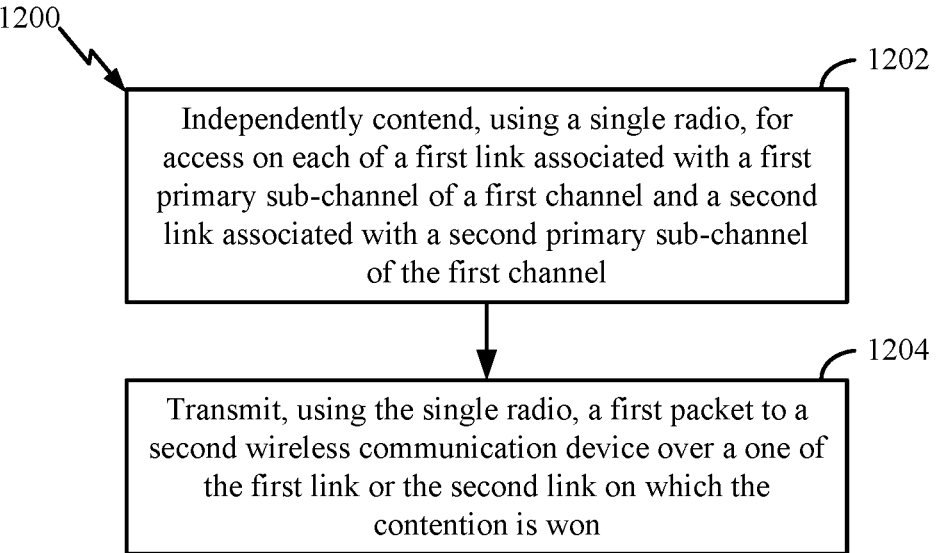

1202

Independently contend, using a single radio, for access on each of a first link associated with a first primary sub-channel of a first channel and a second link associated with a second primary sub-channel of the first channel

1204

Transmit, using the single radio, a first packet to a second wireless communication device over a one of the first link or the second link on which the contention is won

*Figure 12*

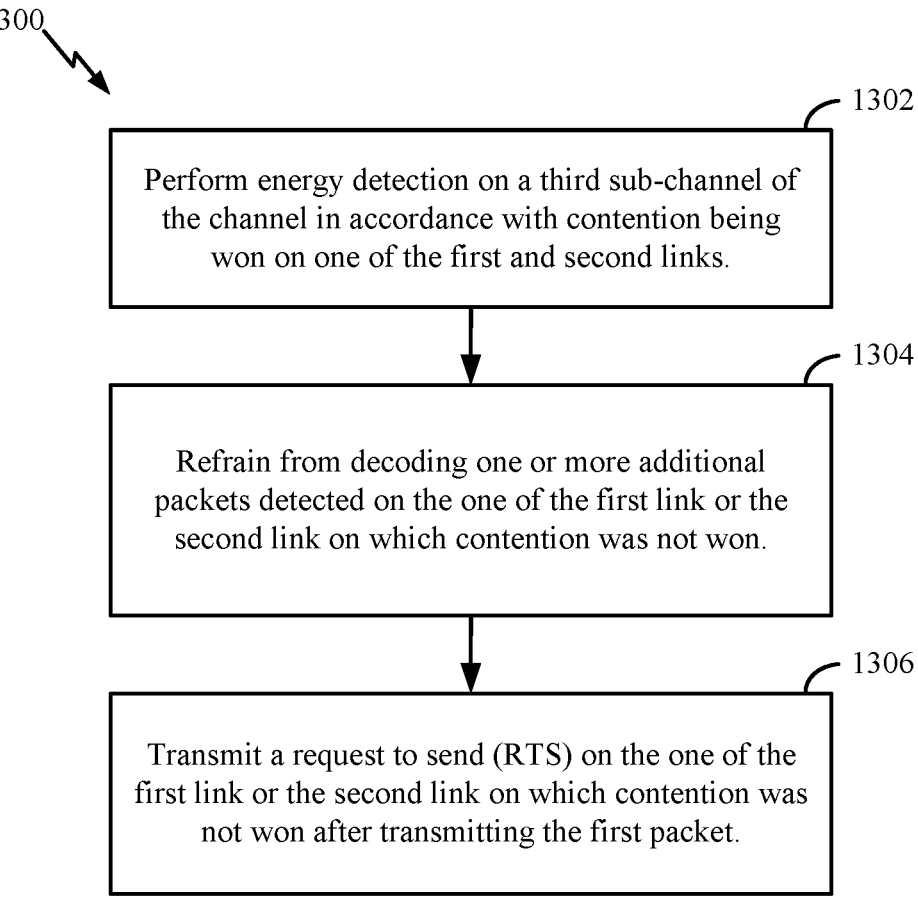

1300

1302

Perform energy detection on a third sub-channel of the channel in accordance with contention being won on one of the first and second links.

1304

Refrain from decoding one or more additional packets detected on the one of the first link or the second link on which contention was not won.

1306

Transmit a request to send (RTS) on the one of the first link or the second link on which contention was not won after transmitting the first packet.

*Figure 13*

INTRA-BAND ENHANCED MULTILINK SINGLE-RADIO COMMUNICATION

TECHNICAL FIELD

This disclosure relates generally to wireless communication, and more specifically, to intra-band enhanced multilink single-radio (eMLSR) communication.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, STAs and APs may be configured to communicate using multiple communication links simultaneously or in different time periods. Such communication may be referred to as multi-link operation (MLO). To facilitate MLO, STA and AP multi-link devices (MLDs) may include multiple STAs and APs, respectively, each configured to communicate on a respective communication link. Typically, the multiple communication links are respectively associated with multiple frequency bands (for example, the 2.4, 5 and 6 GHz frequency bands) or ranges (such as a lower portion of the 5 GHz band and an upper portion of the 5 GHz band). In some examples, a STA and/or AP MLD may simultaneously perform independent contention on each of multiple communication links, each communication link being associated with a different respective frequency band. For example, a STA MLD or an AP MLD may include multiple radio frequency (RF) chains and may monitor all or a portion of each of the frequency bands or ranges associated with each of the multiple links with a respective RF chain.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. The wireless communication device includes one or more memories storing processor-executable code and one or more processors coupled with the one or more memories. The one or more processors are individually or collectively configured to, when executing the code, cause the wireless communication device to independently contend, using a single radio, for access on each of a first link associated with a first primary subchannel of a first channel and a second link associated with a second primary subchannel of the first channel and transmit, using the single radio, a first packet to a second wireless communication device over a one of the first link or the second link on which the contention is won.

Another innovative aspect of the subject matter described in this disclosure can be implemented in a wireless communication device. The wireless communication device includes means for independently contending, using a single radio, for access on each of a first link associated with a first primary subchannel of a first channel and a second link associated with a second primary subchannel of the first channel and means for transmitting, using the single radio, a first packet to a second wireless communication device over a one of the first link or the second link on which the contention is won.

Another innovative aspect of the subject matter described in this disclosure can be implemented in a method for wireless communication. The method includes independently contending, using a single radio, for access on each of a first link associated with a first primary subchannel of a first channel and a second link associated with a second primary subchannel of the first channel and transmitting, using the single radio, a first packet to a second wireless communication device over a one of the first link or the second link on which the contention is won.

In some examples, independently contending for access on each of the first link and the second link includes independently monitoring for a second packet on each of the first primary subchannel and the second primary subchannel.

In some examples, independently contending for access on each of the first link and the second link includes running a respective independent back-off counter for each of the first link and the second link.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 12 shows a flowchart illustrating an example process performable by a wireless communication device that supports intra-band eMLSR communication.

FIG. 13 shows a flowchart illustrating an example process performable by a wireless communication device that supports intra-band eMLSR communication.

Like reference numbers and designations in the various drawings indicate like elements.

DETAILED DESCRIPTION

Figure 1:
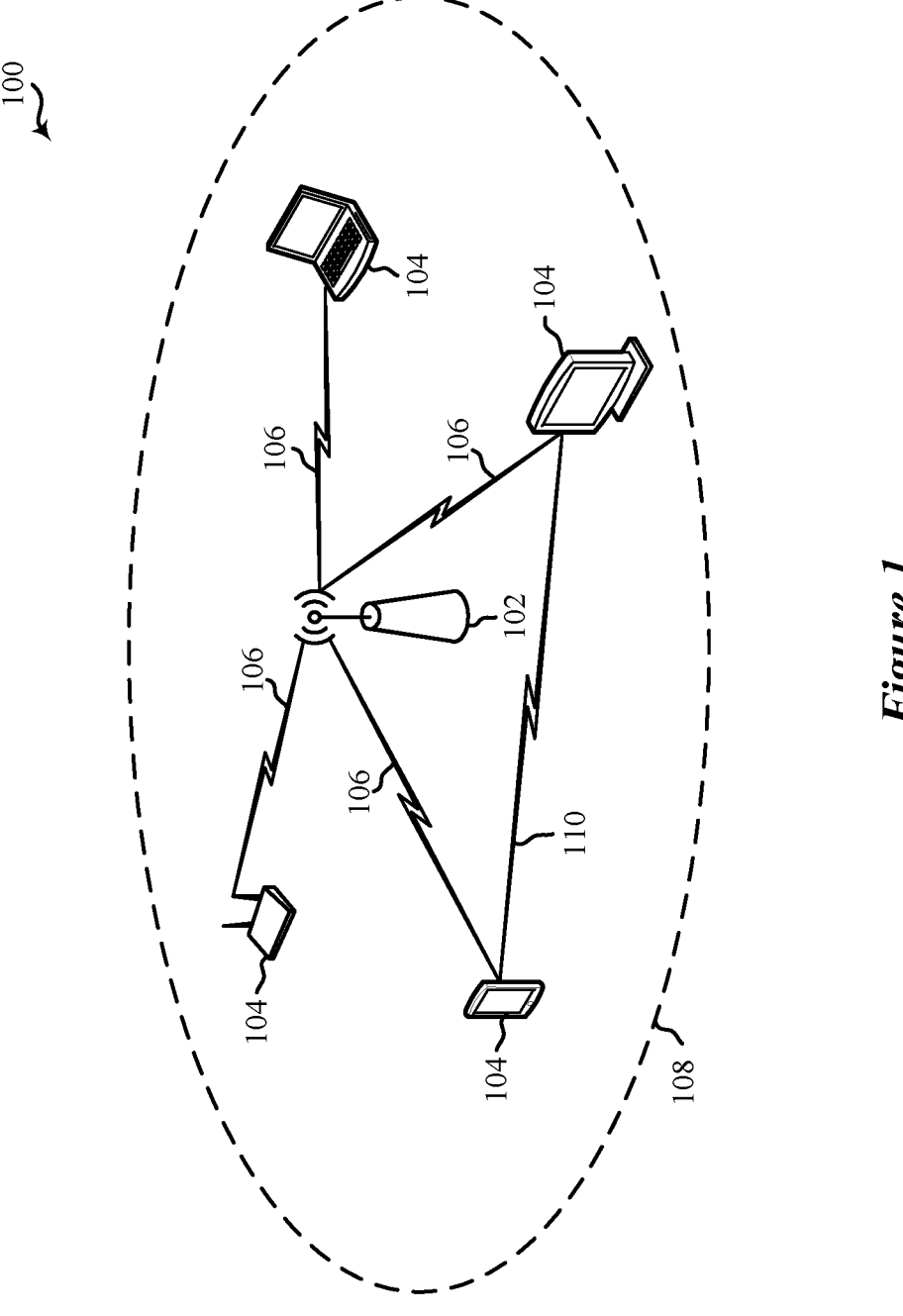
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to multi-link operation (MLO), and more particularly to intra-band enhanced multilink single-radio (eMLSR) communication. Some aspects more specifically relate to techniques for performing, by a multi-link device (MLD), simultaneous but independent contention, using a single common radio, on each of two or more links associated with different respective primary subchannels of a single common wireless channel (for example, a 160, 240, 320, 480 or 640 MHZ bonded channel) associated with a single frequency band, such as associated with one of the 2.4, 5 or 6 GHz frequency bands, among other examples. While inter-band eMLSR communication involves simultaneous independent contention on multiple links associated with different respective frequency bands (or associated with different channels in different respective portions of a frequency band), techniques for intra-band eMLSR operation described herein involve simultaneous independent contention on multiple subchannels of a single wireless channel using a single common radio. For example, a first link may be associated with a first primary subchannel (such as a first primary 20 MHz subchannel) within a single wireless channel (such as a 160, 240, 320, 480 or 640 MHz channel), and a second link may be associated with a second primary channel (such as a second primary 20 MHz subchannel) within the single wireless channel. A primary subchannel may, for example, be a channel on which independent packet detection is performed.

In some aspects, when an access point (AP) of an AP MLD or a station (STA) of a non-AP MLD (also referred to herein as a "STA MLD") wins contention on a respective one of the multiple links, one or more RF chains associated with one or more links on which contention was not won may be transferred to the link on which contention was won. The AP or STA of the AP MLD or non-AP MLD, respectively, associated with the link on which contention was won may then transmit, using the single radio, a packet to a receiving AP or STA of a receiving AP MLD or non-AP MLD, respectively. The receiving AP or STA may, also using a single radio, be performing packet detection on multiple channels associated with the multiple links. When the packet transmitted by the transmitting AP or STA is detected on the link on which contention was won by the transmitting AP or STA, the receiving AP or STA may, in response, transfer one or more RF chains associated with one or more other links to the link on which the packet was detected.

Particular aspects of the subject matter described in this disclosure can be implemented to realize one or more of the following potential advantages. In some examples, by using a single radio to independently contend on multiple links associated with different respective subchannels of a single common wireless channel, the described techniques can be used to reduce latency between wireless communication devices while also reducing cost, size, complexity, and power consumption of such devices. For example, as contention may simultaneously be performed on multiple links associated with a same channel, latency introduced in performing contention may be reduced. Furthermore, as a single radio may be used for performing contention on the multiple links, such latency benefits may be provided even in lower cost or reduced form factor devices.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing one or more of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple Aps 102. AP 102 shown in FIG. 1 can represent various different types of Aps including but not limited to enterprise-level Aps, single-frequency Aps, dual-band Aps, standalone Aps, software-enabled Aps (soft Aps), and multi-link Aps. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a media access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective Aps 102 at a periodic time interval referred to as the target beacon transmission time (TBTT) (measured in time units (Tus) where one TU may be equal to 1024 microseconds (μs)). To perform active scanning, a STA 104 generates and sequentially transmits probe requests on each channel to be scanned and listens for probe responses from Aps 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple Aps 102 that together form an extended service set (ESS) including multiple connected BSSs. An extended network station associated with the WLAN 100 may be connected to a wired or wireless distribution system that may allow multiple Aps 102 to be connected in such an ESS. As such, a STA 104 can be covered by more than one AP 102 and can associate with different Aps 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without Aps 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The Aps 102 and STAs 104 may function and communicate (via the respective communication links 106) according to one or more of the IEEE 802.11 family of wireless communication protocol standards. These standards define the WLAN radio and baseband protocols for the PHY and MAC layers. The Aps 102 and STAs 104 transmit and receive wireless communications (hereinafter also referred to as "Wi-Fi communications" or "wireless packets") to and from one another in the form of PHY protocol data units (PPDUs). The Aps 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 900 MHz band. Some examples of the Aps 102 and STAs 104 described herein also may communicate in other frequency bands, such as the 5.9 GHZ and the 6 GHz bands, which may support both licensed and unlicensed communications. The Aps 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHZ, 5 GHZ or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
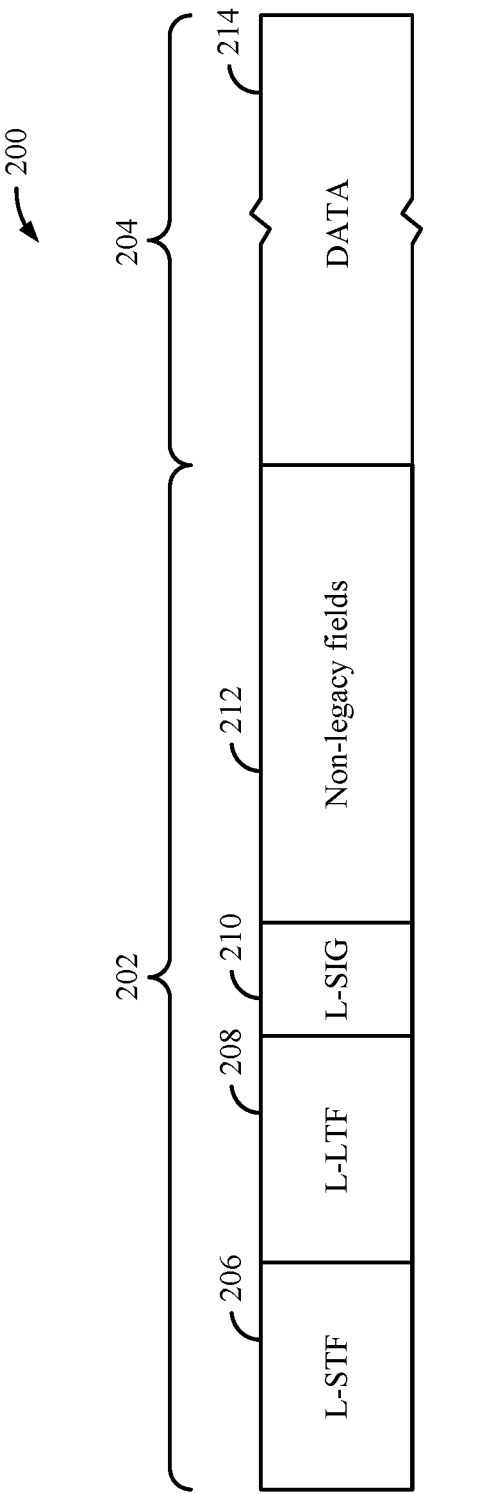
FIG. 2 shows an example protocol data unit (PDU) usable for communications between a wireless access point and one or more wireless stations.

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
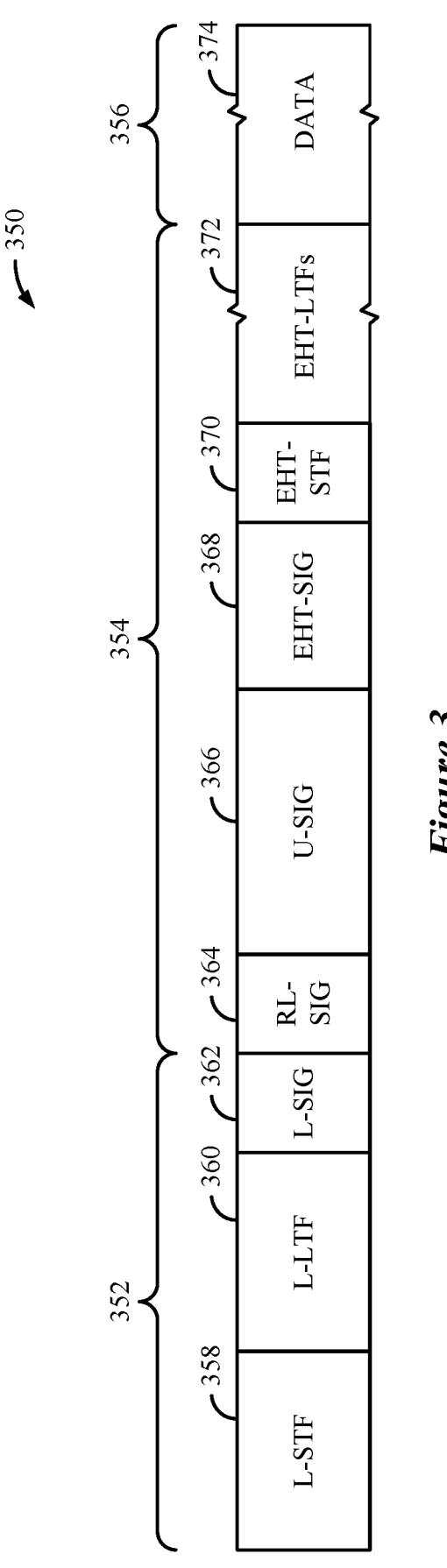
FIG. 3 shows an example physical layer (PHY) protocol data unit (PPDU) usable for communications between a wireless access point (AP) and one or more wireless stations (STAs).

FIG. 3 shows an example PPDU 350 usable for communications between a wireless AP and one or more wireless STAs. The PPDU 350 may be used for SU, OFDMA or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP to identify and inform one or multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user (for example, STA-specific) signaling information. Each EHT-SIG 368 may include a common field and one or more user-specific fields. In the context of OFDMA, the common field can indicate RU distributions to multiple STAs 104, indicate the RU assignments in the frequency domain, indicate which Rus are allocated for MU-MIMO transmissions and which Rus correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding Rus in the associated data field 374.

In some wireless communications environments, Extremely High Throughput (EHT) systems or other systems compliant with future generations of the IEEE 802.11 family of wireless communication protocol standards may provide additional capabilities over other previous systems (for example, High Efficiency (HE) systems or other legacy systems). EHT and newer wireless communication protocols may support flexible operating bandwidth enhancements at Aps and STAs, such as broadened operating bandwidths relative to legacy operating bandwidths or more granular operation relative to legacy operation. For example, an EHT system may allow communications spanning operating bandwidths of 20 MHZ, 40 MHZ, 80 MHZ, 160 MHz. 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device operates in a contiguous 320 MHz bandwidth mode or a 160+160 MHz bandwidth mode. Signals for transmission may be generated by two different transmit chains of the device each having a bandwidth of 160 MHZ (and each coupled to a different power amplifier). In some other examples, signals for transmission may be generated by four or more different transmit chains of the device, each having a bandwidth of 80 MHZ.

In some other examples, the wireless communication device may operate in a contiguous 240 MHz bandwidth mode, or a noncontiguous 160+80 MHz bandwidth mode. In some examples, the signals for transmission may be generated by three different transmit chains of the device, each having a bandwidth of 80 MHZ. In some other examples, the 240 MHz/160+80 MHz bandwidth modes may also be formed by puncturing 320/160+160 MHz bandwidth modes with one or more 80 MHZ subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate subchannel sets. For example, the 320 MHz bandwidth may be contiguous and located in the same 6 GHz band or noncontiguous and located in different bands (such as partly in the 5 GHZ band and partly in the 6 GHz band).

In some examples, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Figure 4:
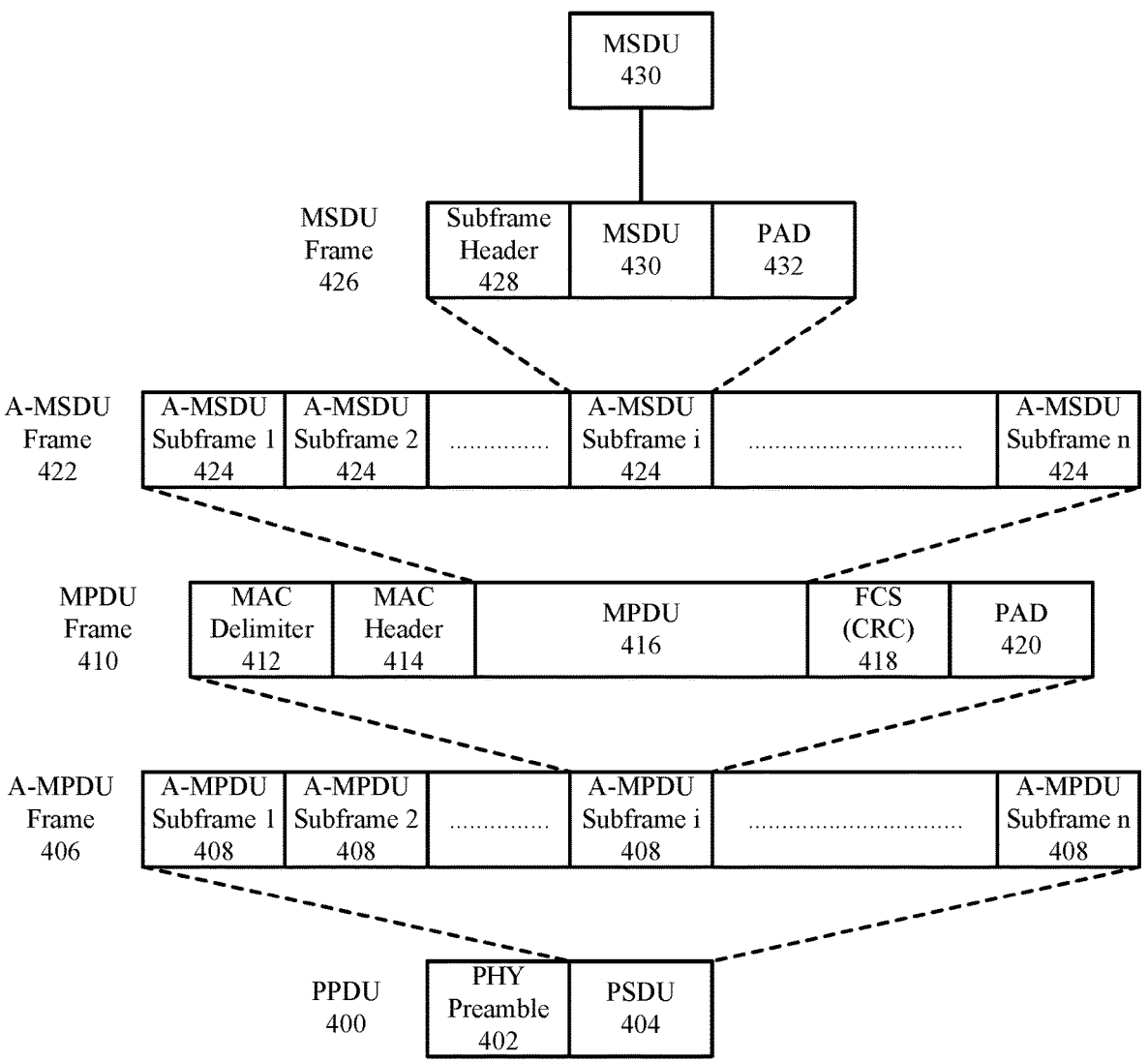
FIG. 4 shows a hierarchical format of an example PPDU usable for communications between a wireless AP and one or more wireless STAs.

FIG. 4 shows a hierarchical format of an example PPDU usable for communications between a wireless AP 102 and one or more wireless STAs 104. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (for example, identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (Acs): voice (AC_VO), video (AC_VI), background (AC_BK), and best effort (AC_BE). This enables particular types of traffic to be prioritized in the network.

Some wireless communication devices (including both Aps and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple Aps each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to the utilization of available resources to achieve higher throughput. That is, during at least some duration of time, transmissions or portions of transmissions may occur over two or more links in parallel at the same time. In some examples, the parallel wireless communication links may support synchronized transmissions. In some examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, one or more of the wireless communication devices operates in a full duplex mode. Generally, full duplex operation enables bi-directional communications where one or more of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 5:
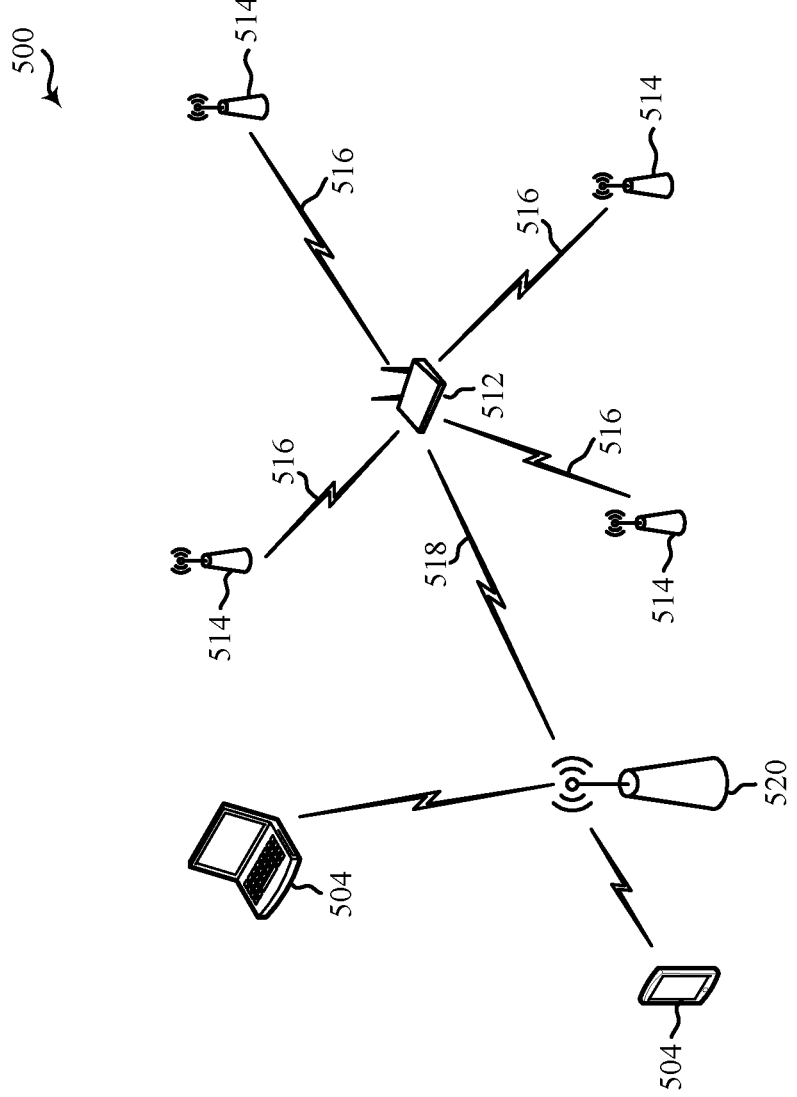
FIG. 5 shows a pictorial diagram of another example wireless communication network 500.

FIG. 5 shows a pictorial diagram of another example wireless communication network 500. According to some aspects, the wireless communication network 500 can be an example of a mesh network, an IoT network or a sensor network in accordance with one or more of the IEEE 802.11 family of wireless communication protocol standards (including the 802.11ah amendment). The wireless network 500 may include multiple wireless communication devices 514. The wireless communication devices 514 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 514 sense, measure, collect or otherwise obtain and process data and then transmit such raw or processed data to an intermediate device 512 for subsequent processing or distribution. Additionally or alternatively, the intermediate device 512 may transmit control information, digital content (for example, audio or video data), configuration information or other instructions to the wireless communication devices 514. The intermediate device 512 and the wireless communication devices 514 can communicate with one another via wireless communication links 516. In some examples, the wireless communication links 516 include Bluetooth links or other PAN or short-range communication links.

In some examples, the intermediate device 512 also may be configured for wireless communication with other networks such as with a Wi-Fi WLAN or a wireless (for example, cellular) wide area network (WWAN), which may, in turn, provide access to external networks including the Internet. For example, the intermediate device 512 may associate and communicate, over a Wi-Fi link 518, with an AP 502 of a WLAN network, which also may serve various STAs 504. In some examples, the intermediate device 512 is an example of a network gateway, for example, an IoT gateway. In such a manner, the intermediate device 512 may serve as an edge network bridge providing a Wi-Fi core backhaul for the IoT network including the wireless communication devices 514. In some examples, the intermediate device 512 can analyze, preprocess and aggregate data received from the wireless communication devices 514 locally at the edge before transmitting it to other devices or external networks via the Wi-Fi link 518. The intermediate device 512 also can provide additional security for the IoT network and the data it transports.

Inter-band eMLSR operation is a form of MLO that is characterized by use of multiple respective radios to perform contention on respective links associated with different respective frequency bands and, when contention is won on one of the respective links, use of a single radio to communicate on the link on which contention is won. An inter-band eMLSR-capable MLD includes multiple radios that enable simultaneous but independent contention on multiple links associated with different respective channels in different frequency bands or ranges. In particular, for inter-band eMLSR communication, an AP MLD or STA MLD includes at least one respective radio for each of the multiple links. For example, inter-band eMLSR communication generally requires dual band simultaneous (DBS) capability. Each of the two or more radios generally includes a respective radio frequency (RF) chain, including a respective RF front end, a respective mixer, a respective local oscillator (for example, a synthesizer), and a respective analog-to-digital converter (ADC).

Figure 6:
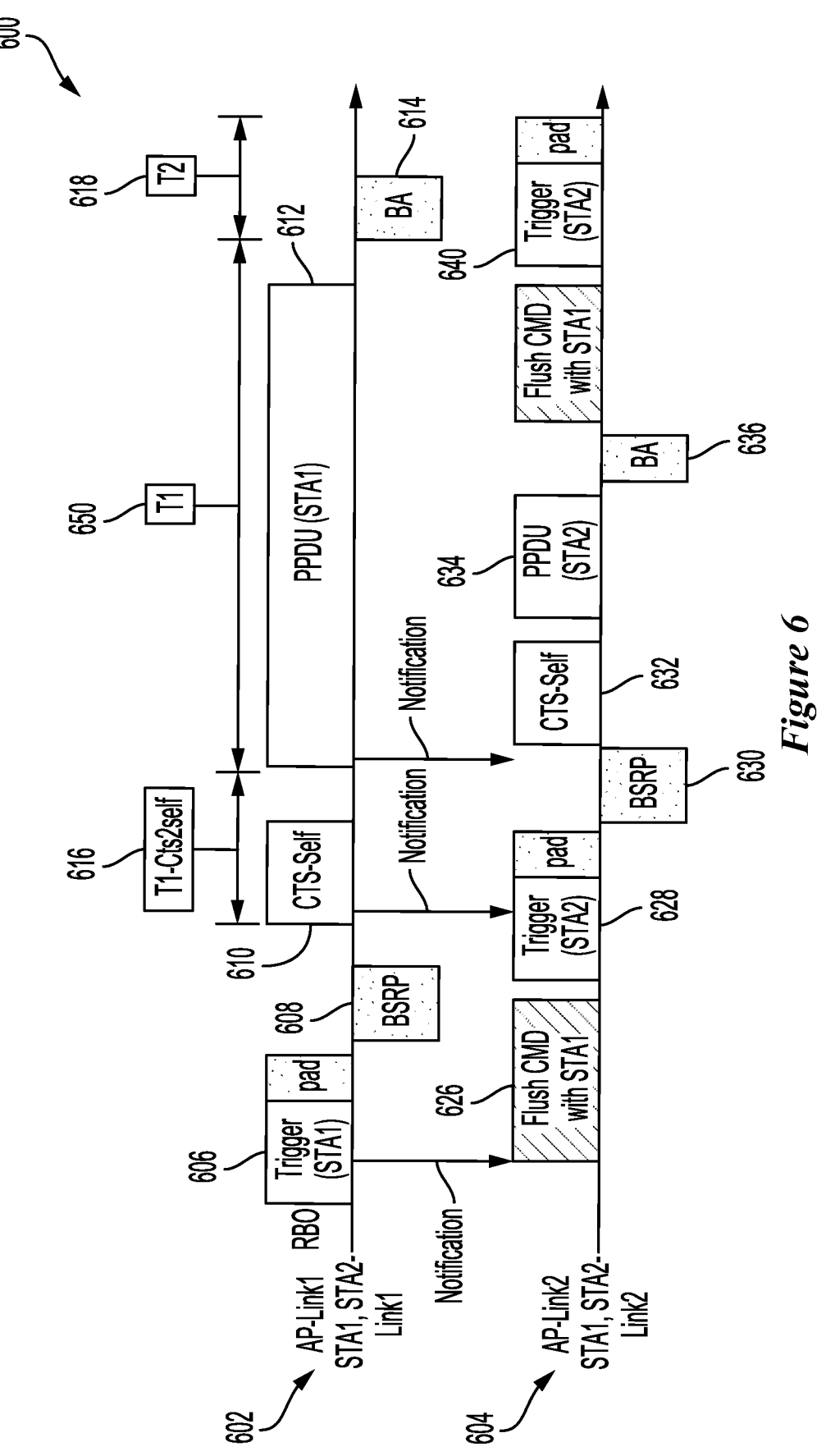
FIG. 6 shows an example packet exchange between a non-AP multi-link device (MLD) configured for inter-band enhanced multi-link single-radio (eMLSR) operation and an AP MLD also configured for inter-band eMLSR.

FIG. 6 shows an example packet exchange 600 between a STA MLD configured for inter-band eMLSR operation and an AP MLD, also configured for inter-band eMLSR operation. A first AP of the AP MLD may communicate with a first STA of the STA MLD on a first link 602. Similarly, a second AP of the AP MLD may communicate with a second STA of the STA MLD on a second link 604. The first link 602 may, for example, be associated with a channel or set of channels within the 2.4 GHz or 5 GHz bands, and the second link 604 may be associated with a channel or set of channels within the 6 GHz frequency band. Each of the AP MLD and the STA MLD may monitor and contend for access to the wireless medium with one radio on the first link 602 and a different radio on the second link 604 to detect transmission of a packet by another wireless communication device such as the other of the AP MLD and the STA MLD. For didactic purposes, the following description of FIG. 6 assumes that the first AP of the AP MLD wins contention on the first link 602.

In association with winning contention on the first link 602, the first AP may transfer one or more radios associated with the second link 604 to the first link 602, for use in communication on the first link 602. The first AP of the AP MLD may also, in association with winning contention on the first link 602, transmit a trigger frame 606 via the first link 602 to the first STA of the STA MLD, and the first STA of the STA MLD may receive the trigger frame 606 via the first link 602. In association with receipt of the trigger frame 606, the second STA of the STA MLD on the second link 604 may, at 626, transfer the radio associated with the second link 604 to the first link 602. As a result of the transfer of the radio associated with the second link 604 to the first link 602, the STA MLD may then be unable to detect a second trigger frame 628 transmitted via the second link while communicating on the first link 602 because the second STA of the STA MLD is no longer able to monitor the second link 604 to detect packets.

The STA MLD may further, in accordance with receipt of the trigger frame 606, transmit a buffer status report (BSRP) 608, and the AP MLD may receive the BSRP 608. After receiving the BSRP 608, the AP MLD may transmit and the STA MLD may receive a clear-to-send-to-self message 610 from the AP during time 616. The AP MLD may then transmit and the STA MLD may receive a PPDU 612 during time 650 on the first link 602. After receiving the PPDU 612, the STA MLD may transmit and the AP MLD may receive, at time 618, a block acknowledgement 614 on the first link 602. After respective transmission and reception of the block acknowledgement, the AP MLD and the STA MLD may each transfer one or more respective radios back to the second link 604.

As another example, if the AP MLD wins contention on the second link 604, a similar process may be performed. For example, the AP MLD may transmit and the STA MLD may receive a trigger frame 628. The STA MLD may transmit, in association with receipt of the second trigger frame 628, and the AP MLD may receive a buffer status report 630 on the second link 604. In accordance with receipt of the buffer status report 630, the AP MLD may transmit and the STA MLD may receive a clear-to-send-to-self message 632 and a PPDU 634 on the second link 604. In accordance with receipt of the PPDU 634, the STA MLD may transmit and the AP MLD may receive a block acknowledgement 636 on the second link 604 after reception of the PPDU 634 is complete. Subsequent contention wins by the AP MLD on the second link 604 may result in transmission of additional trigger frames, such as trigger frame 640.

Figure 7:
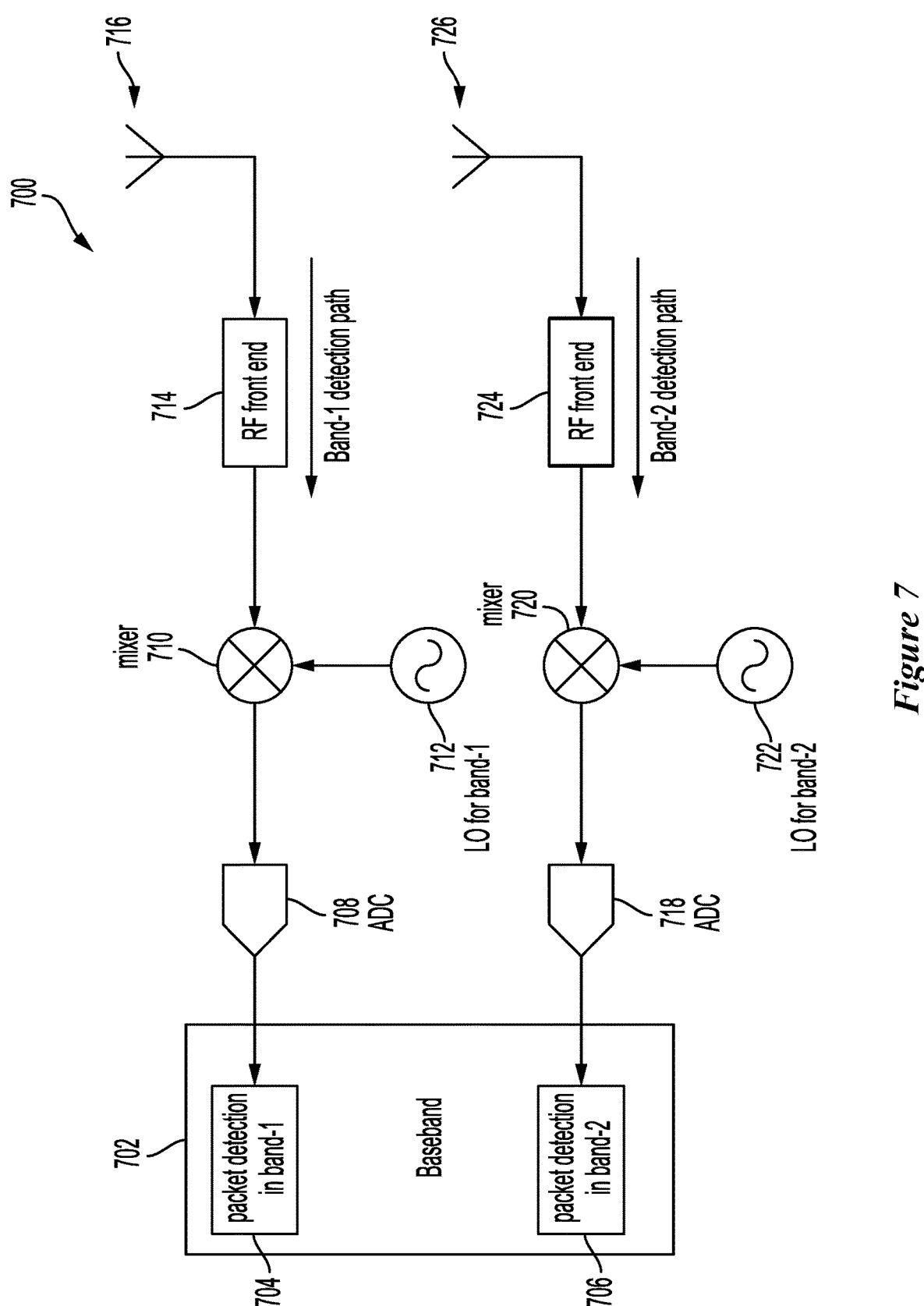
FIG. 7 shows a block diagram of an example wireless communication device that supports inter-band eMLSR communication.

FIG. 7 shows a block diagram of an example wireless communication device 700 that supports inter-band eMLSR communication. The wireless communication device 700 may, for example, be a STA MLD. The wireless communication device 700 may include a first radio including a first RF chain and a second radio including a second RF chain. The first RF chain may include a first antenna 716, a first RF front end 714, a first mixer 710, a first local oscillator 712 (for example, a synthesizer), and a first ADC 708 and the second RF chain may include a second antenna 726, a second RF front end 724, a second mixer 720, a second local oscillator 722 (for example, a synthesizer), and a second ADC 718. In some examples, the first RF chain may share an antenna with the second RF chain. Thus, antenna 716, for example, may be shared between the first and second RF chains. In some examples, antennas 716, 726 may be separate and distinct from the respective RF chains. The RF front ends 714, 724 may, for example, include filters and other RF front end components. Each respective RF chain may be assigned to a different respective link associated with one or more channels of a different respective frequency band. For example, the wireless communication device 700 may monitor multiple links, each link associated with a respective channel of a different frequency band, using a different RF chain associated with a different radio for each link. As one example, the first RF chain associated with the first radio may be assigned to a first link associated with a first channel of a 6 GHz band, while the second RF chain associated with the second radio may be assigned to a second link associated with a second channel of a 2.4 GHz band. The wireless communication device 700 may include a baseband processor 702, which may include or implement at least a portion of a packet detector for each channel. For example, signals received on one or more subchannels of the first channel associated with the first link via the first RF chain may be provided to a first packet detector 704, and signals received on one or more subchannels of the second channel associated with the second link via the second RF chain may be provided to a second packet detector 706. The packet detectors 704, 706 of the baseband processor 702 may be physically distinct packet detectors configured in the baseband processor 702 or may be virtually distinct and may share one or more components. When a packet is first detected on one or more subchannels associated with a particular link using one of the radios, the other radio(s), including their respective RF chains, may be transferred to the link associated with the one or more subchannels on which the packet was first detected. As shown in FIG. 7, the wireless communication device 700 that supports inter-band eMLSR includes two, or more, radios, each radio including a respective RF chain including multiple physical components. Inclusion of two, or more, radios in a wireless communication device may require increased area of the wireless communication device, may result in increased power consumption of the wireless communication device, and may increase a cost of production of the wireless communication device.

As described above, various aspects relate particularly to intra-band eMLSR communication. Some aspects more specifically relate to techniques for performing, by an MLD (such as a STA MLD or an AP MLD), simultaneous but independent contention, using a single common radio, on each of two or more links associated with different respective primary subchannels of a single common wireless channel (for example, a 160, 240, 320, 480 or 640 MHz bonded channel) associated with a single frequency band, such as associated with one of the 2.4, 5 or 6 GHz frequency bands, among other examples. While inter-band eMLSR communication involves simultaneous independent contention on multiple links associated with different respective frequency bands (or associated with different sets of channels in different respective portions of a frequency band), techniques for intra-band eMLSR operation described herein involve simultaneous independent contention on multiple subchannels of a single wireless channel in a single portion of a frequency band using a single common radio. For example, a first link may be associated with a first primary subchannel (such as a first primary 20 MHz subchannel) of a single wireless channel (such as a 160, 240, 320, 480 or 640 MHz channel) and a second link may be associated with a second primary channel (such as a second primary 20 MHz subchannel) within the single wireless channel. A primary subchannel may, for example, be a channel on which independent packet detection is performed.

A single radio may be sufficient for support of intra-band eMLSR because simultaneous independent contention may be performed on multiple links associated with particular subchannels of a single channel of a single frequency band. Thus, intra-band eMLSR may provide latency reduction benefits similar to inter-band eMLSR without the increased cost, space, and power requirements introduced by including multiple radios in a single wireless communication device. As one example, intra-band eMLSR may be useful in the context of wearable devices, where space, cost, and power consumption concerns are increasingly prevalent.

Figure 8:
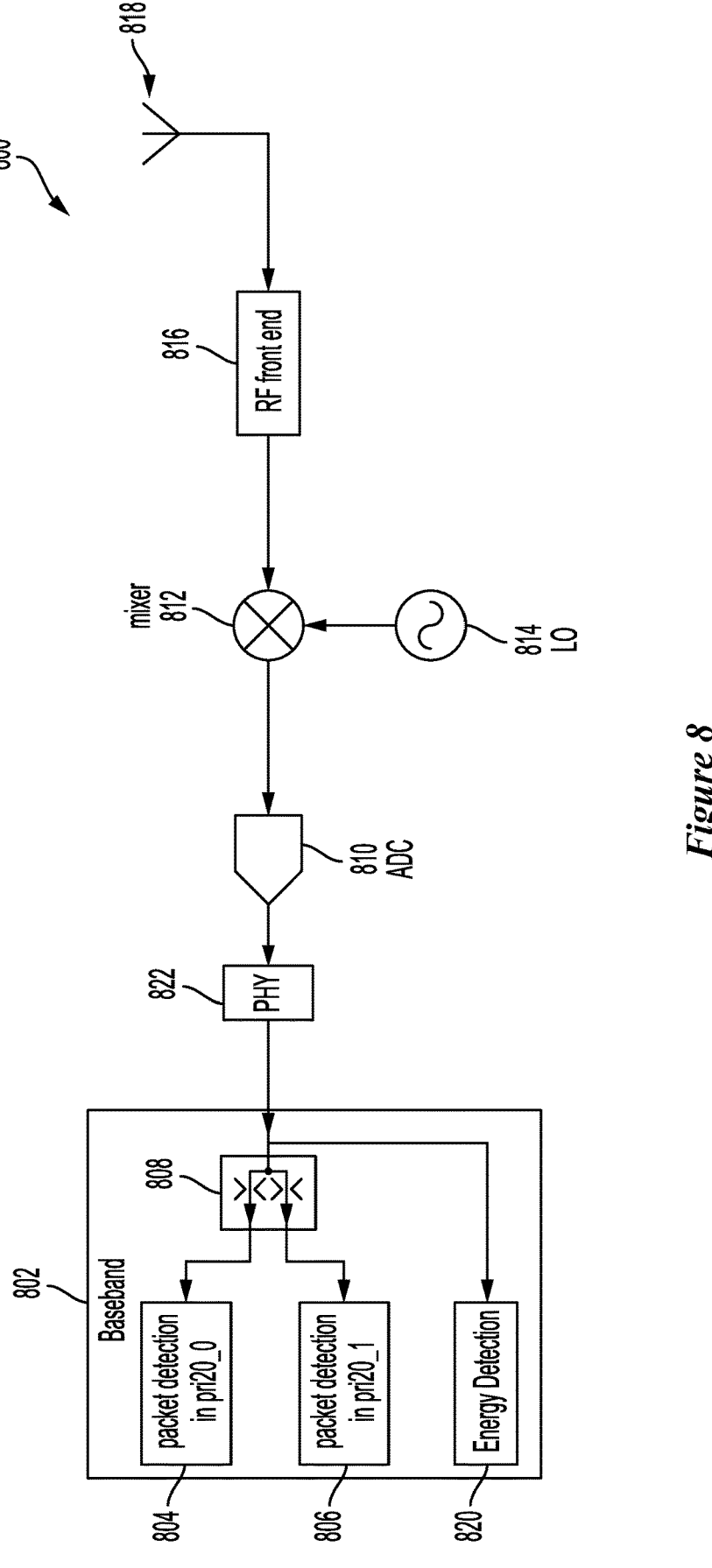
FIG. 8 shows a block diagram of an example wireless communication device that supports intra-band eMLSR communication.

FIG. 8 shows a block diagram of an example wireless communication device 800 that supports intra-band eMLSR communication. The wireless communication device 800 may, for example, be a STA MLD or an AP MLD including a single radio. The single radio may include a single RF chain including an antenna 818, an RF front end 816, a local oscillator 814, a mixer 812, and an ADC 810. The local oscillator 814 may, for example, be a synthesizer locked to a single frequency for the single radio. In some other examples, the single radio may include multiple RF chains. In some examples, the antenna 818 may be separate from the RF chain(s). In some other examples, the antenna 818 may be shared by multiple RF chains. The single radio of the wireless communication device 800 may, in association with performing simultaneous independent contention on multiple links, monitor for signals, such as signals containing packets, transmitted on the multiple links. In some examples, each of the links may be associated with a same single one of the 2.4, 5, or 6 GHz frequency bands, or another frequency band. In some examples, each of the links may be associated with a same single wireless channel such as, for example, a 160, 240, 320, 480 or 640 MHz bandwidth channel within the single frequency band. The single channel includes multiple subchannels. Each of the subchannels may be, for example, a 20 MHz subchannel. In some examples, a first link of the multiple links may be associated with a first primary subchannel (such as a first primary 20 MHz subchannel) and a second link of the multiple links may be associated with a second primary subchannel (such as a second primary 20 MHz subchannel) within the single wireless channel.

The radio may pass received signals, converted by the ADC 810 to digital signals, to a baseband processor 802 of the wireless communication device 800. In some examples, the radio may include a physical layer (PHY) 822 to facilitate communication with the baseband processor 802. In some examples, the radio may include a single common PHY for all the multiple links, while in other examples, the single radio may include multiple respective PHYs for the multiple respective links. A splitter 808 may split the received signal into the different subchannels of the channel and may pass received signal data for certain subchannels of the channel to respective packet detectors 804, 806. The splitter 808 may pass received signal data for the first primary 20 MHz subchannel to the first packet detector 804 and received signal data for the second primary 20 MHz subchannel to the second packet detector 806. In some other examples, the baseband processor 802 may include more than two packet detectors for detecting packets received on more than two subchannels associated with more than two links. The packet detectors 804, 806 may be physically distinct packet detectors on the baseband chip 802, or may be virtually separate entities sharing one or more components.

Packet detectors 804, 806 may be used to monitor respective primary subchannels associated with respective links for transmission of packets by another wireless communication device that has won contention on one of the respective links. When a packet is detected by one of the packet detectors 804, 806, the wireless communication device 800 may determine that contention has been won by the other wireless communication device that transmitted the packet on the link associated with the subchannel on which the packet is detected. The wireless communication device 800 may then receive, from the other wireless communication device, a packet using at least the subchannel on which the packet is detected. In some examples, the wireless communication device 800 may receive a packet using a portion of the channel associated with the link on which the packet is detected, such as on a half or all of the channel with which the link is associated.

The baseband processor 802 may also include an energy detection module 820 which may perform energy detection on other subchannels of the channel, such as subchannels other than the subchannels on which packet detection is performed by packet detectors 804, 806. Subchannels other than the subchannels on which packet detection is performed may be referred to as secondary 20 MHz subchannels. In some examples, the energy detection module 820 may perform energy detection on one or more secondary 20 MHz subchannels after the wireless communication device 800 determines contention has been won by the other wireless communication device according to detection of a packet by one of packet detectors 804, 806. In some examples, packet detectors 804, 806 may perform packet detection by determining whether an energy level of any valid packet detected on the primary subchannels to which the packet detectors 804, 806 are assigned is above a first threshold. In some examples, the energy detection module 820 may perform energy detection by determining whether respective energy levels on respective subchannels are greater than a second threshold, where the second threshold is lower than the first threshold. The first threshold for packet detection may, for example, be greater than the second threshold for energy detection. In some examples, once a packet is detected on one of the subchannels assigned to the packet detectors 804, 806, the other of the subchannels on which packet detection is performed may be re-designated as a secondary 20 MHZ subchannel.

The wireless communication device 800 may, alternatively or additionally, perform contention on each of the first and second links. In performing contention on multiple links using a single radio, the wireless communication device 800 may perform an independent back-off on each of the plurality of links associated with the plurality of primary subchannels, such as by running independent back-off counters for each of the first and second primary subchannels. When the back-off counter associated with a one of the primary subchannels expires, contention is won on the link associated with the primary subchannel, and the wireless communication device 800 may transmit one or more packets, using the single radio, to one or more other wireless communication devices using all or a portion of the bandwidth of the channel. The packet detectors 804, 806 may be used by the wireless communication device 800 to perform contention on the first and second links associated with the first and second subchannels of the channel for subsequent transmission by the wireless communication device 800. For example, when the wireless communication device 800 is contending on the first and second links, a packet detected by the first packet detector 804 or the second packet detector 806 may indicate that contention is lost on the respective link on which the packet is detected. Thus, the packet detectors 804, 806 may be used to determine when contention is lost for transmission of a packet by the wireless communication device 800 and/or when contention is won by another wireless communication device for transmission of a packet to the wireless communication device 800. Similarly, energy detection, as described herein, may be performed by the energy detection module 820 as part of or subsequent to contention on each of the first and second links by the wireless communication device 800.

Figure 9A:
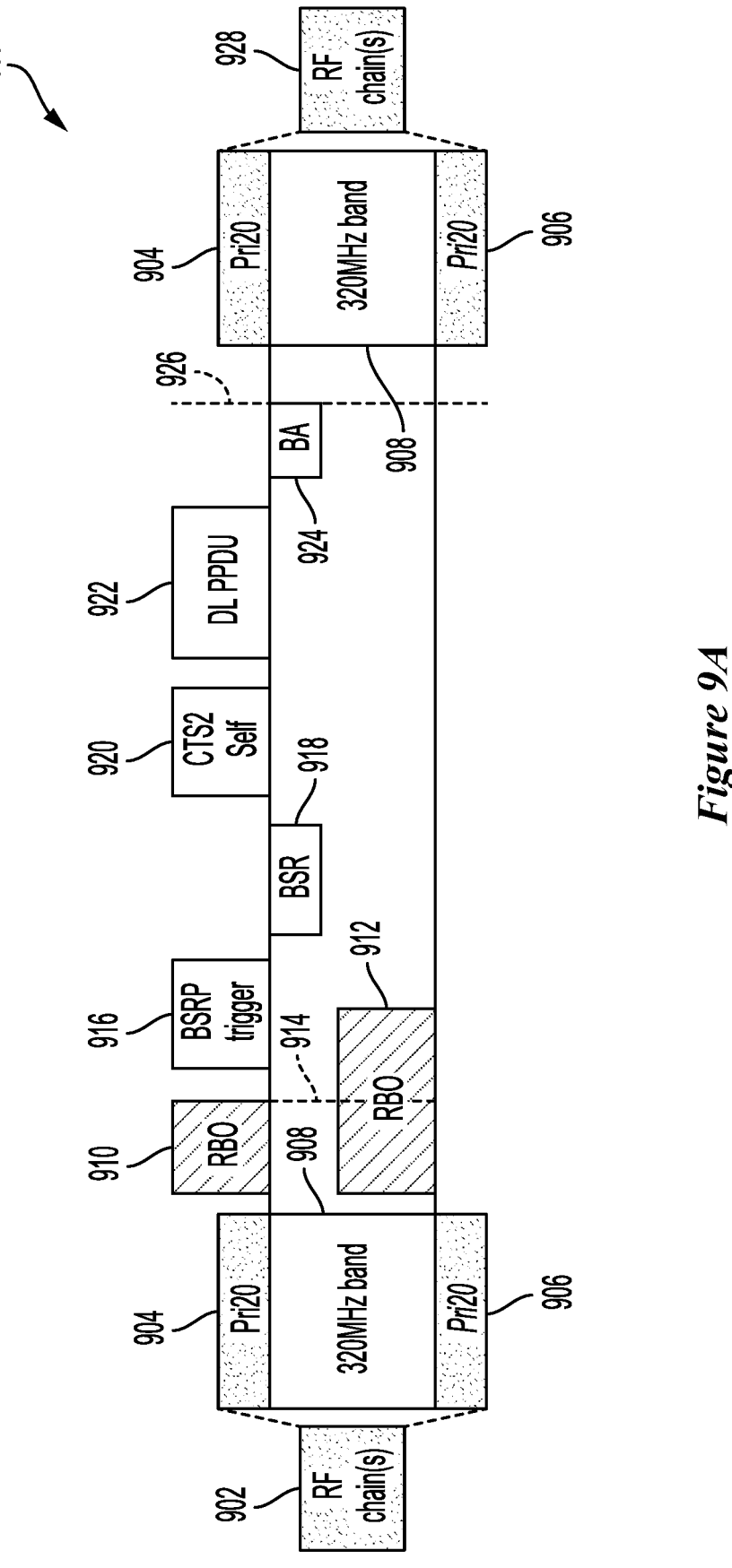
FIG. 9A shows an example packet exchange between a non-AP MLD and an AP MLD that support intra-band eMLSR communication.

FIG. 9A shows an example packet exchange 900 between a STA MLD and an AP MLD that support intra-band eMLSR communication. The packet exchange 900 of FIG. 9A may, for example, be a packet exchange in which an AP MLD transmits a downlink PPDU to a STA MLD on a link on which contention is won using intra-band eMLSR. For example, in FIG. 9A, an AP MLD may include a first single radio, the first single radio including a first set of one or more RF chains 902. The AP MLD may communicate with a STA MLD including a second single radio, the second single radio including a second set of one or more RF chains 928. In some examples, the AP MLD and the STA MLD may each include more than one radio. The AP MLD and the STA MLD may communicate via a channel 908 of a frequency band, such as a channel having a bandwidth of 320 MHz or another bandwidth. In some examples, such a channel 908 may be associated with a 6 GHz frequency band, a 5 GHz frequency band, a 2.4 GHz frequency band, or another frequency band.

The AP MLD may use the first set of RF chains 902 of the first single radio to monitor two or more links associated with two or more respective subchannels of the channel 908 for packet transmission, and the STA MLD may use the second set of RF chains 928 of the second single radio to monitor the same two or more subchannels of the channel 908 for packet transmission. For example, each of the AP MLD and the STA MLD may monitor a first subchannel 904 and a second subchannel 906 of the channel 908. In some examples, more than two subchannels may be monitored for packet transmission. In some examples, the first subchannel 904 and the second subchannel 906 may be 20 MHz channels. In some examples, the first subchannel 904 and the second subchannel 906 may be designated as primary 20 MHz channels, on which contention may be performed.

The first subchannel 904 may be associated with a first link between the AP MLD and the STA MLD, and the second subchannel 906 may be associated with a second link between the AP MLD and the STA MLD. In some examples, a certain portion of the channel 908, such as half or all of the channel 908, may be assigned for use by each link in transmitting packets when contention is won on that link. Thus, while contention and/or packet detection may be performed on a first subchannel 904, associated with a link, a greater portion of the channel 908, such as half or all of the channel including the first subchannel 904, may be assigned for transmission of packets via the first link after contention is won. A bandwidth assigned for transmission of packets on a link after contention is won may be referred to as a packet bandwidth, while a bandwidth of the channel 908 may be referred to as a channel bandwidth.

In some examples, the AP MLD including the first single radio and the first set of RF chains 902 may designate the first subchannel 904 as a first primary 20 MHZ subchannel and the second subchannel 906 as a second primary 20 MHZ subchannel. In some examples, the AP MLD may assign a first AP of the AP MLD to a first link associated with the first subchannel 904 and a second AP of the AP MLD to a second link associated with the second subchannel 906. In some examples, both of the first AP assigned to the first link associated with the first subchannel 904 and the second AP associated with the second link assigned to the second subchannel 906 may occupy an entire available bandwidth of the channel 908 when contention is won by either respective AP. Thus, when contention is won on either the first link associated with the first subchannel 904 or the second link associated with the second subchannel 906, transmissions, such as transmissions of the downlink packet 922, may have a bandwidth of up to the bandwidth of the channel, such as up to 320 MHZ. In some examples, the first AP assigned to the first link associated with the first subchannel 904 and the second AP assigned to the second link associated with the second subchannel 906 may each occupy a contiguous half bandwidth. For example, the first AP assigned to the first link associated with the first subchannel 904 may occupy a first 160 MHz band, including the first subchannel 904, and the second AP assigned to the second link associated with the second subchannel 906 may occupy a second 160 MHz band, including the second subchannel 906. Thus, as one example, a packet bandwidth for each link may be 160 MHz.

In some examples, one of the APs, such as the first AP assigned to the first link associated with the first subchannel 904, may be configured to associate only with STAs that support intra-band eMLSR, while the other of the APs, such as the second AP assigned to the second link associated with the second subchannel 906, may be configured to associate with STAs that do not support intra-band eMLSR, in addition to STAs that support intra-band eMLSR. Thus, for example, if contention is won on the first subchannel 904, assigned to the first AP that is configured to associate only with STAs that support intra-band eMLSR, only intra-band eMLSR supporting STA clients may be grouped together for multi-user, OFDMA, TB PPDU transmissions on the first link following contention. The AP MLD may broadcast separate beacons using each of the APs assigned to each of the links associated with each of the subchannels 904, 906.

The AP MLD may, using the first single radio having the first set of RF chains 902, independently contend on a first link, associated with the first subchannel 904, and a second link, associated with the second subchannel 906. Independent contention may, for example, include simultaneously monitoring the first link, such as monitoring the first subchannel 904, for packet transmission using a first packet detector and the second link, such as the second subchannel 906, for packet transmission using a second packet detector. Independent contention may alternatively or additionally include performing a first independent random back-off (RBO) procedure on the first link and a second independent RBO procedure on the second link. For example, the AP MLD may run an independent back-off counter for each of the first link, such as for the first subchannel 904, and the second link, such as for the second subchannel 906. In some examples, each AP of the AP MLD may be assigned a separate lower media access control (MAC) layer associated with a lower MAC address, which may be associated with the separate backoff counters. The AP MLD may win contention on the first link associated with the first subchannel 904 or the second link associated with the second subchannel 906 when a first back-off counter, of multiple respective independent back-off counters for the subchannels on which contention is being performed, expires. The AP MLD may determine that contention has been lost on the first link associated with the first subchannel 904 or the second link associated with the second subchannel 906 if a packet is detected on the first link or the second link during an independent RBO procedure on the first link or the second link. Similarly the STA MLD, using the second single radio having the set of RF chains 928, may independently contend on the first link associated with the first subchannel 904 and the second link associated with the second subchannel 906. For example, both the AP MLD and the STA MLD may monitor each subchannel 904, 906 for transmitted packets and execute independent RBO procedures for each subchannel 904, 906.

When contention is won by the AP MLD on the first link associated with the first subchannel 904, the AP MLD may transmit a packet to the STA MLD using at least the first subchannel 904. For example, at time 914, contention may be won on the first link associated with the first subchannel 904, and the AP MLD may transmit a buffer status report (BSRP) trigger frame 916. When contention is won on the first link, the AP MLD may cease monitoring the second link. For example, the AP MLD may be unable to monitor for packets received on the second link as the RF chain(s) of the AP MLD may be used to transmit on the first link.

The STA MLD may detect the packet, such as the BSRP trigger frame 916, transmitted on the first link associated with the first subchannel 904. The STA MLD may determine that the AP MLD has won contention on the first link based on detection of the packet and may refrain from decoding packets received on the second link associated with the second subchannel 906 and/or may designate the second subchannel 906 as a secondary 20 MHz channel until the STA MLD receives a downlink PPDU. Likewise, the AP MLD may designate the second subchannel 906 as a secondary 20 MHz channel until the AP MLD transmits a downlink PPDU. As one particular example, the STA MLD determines that the AP MLD has won contention on a link, the STA MLD may ignore packets received on one or more links on which contention was not won. In particular, if a bandwidth allocated for a link on which contention is won by the AP MLD is less than a total channel bandwidth, the STA MLD may ignore packets received on the part of the channel bandwidth not allocated for transmission of packets on the link on which contention is won. For example, if the first AP of the AP MLD wins contention on the first link associated with the first subchannel 904, the first AP may be configured to transmit one or more packets on a contiguous 160 MHz of the 320 MHz of the channel 908 including the first subchannel 904 associated with the first link. The receiving STA MLD may ignore packets received on the other 160 MHZ of the channel 908 not allocated for transmission of packets when contention is won on the first link. As discussed herein, the 320 MHz of the channel 908 may be referred to as a channel bandwidth, while the portion of the channel 908 including the subchannel on which contention is won, allocated for packet transmission following contention may be referred to as a packet bandwidth. Thus, when a packet bandwidth is less than a channel bandwidth, such as when the packet bandwidth is 160 MHz and the channel bandwidth is 320 MHZ, packets received on the other 160 MHz of the 320 MHz channel 908, including a subchannel associated with a link on which contention is not won, may be ignored by the STA MLD. Such ignoring may, for example, include refraining from decoding packets received on the other 160 MHz of the channel 908. Similarly, if a STA MLD wins contention for transmission to an AP MLD on a first link including a first subchannel, as described with respect to FIG. 9B, the AP MLD may ignore packets received on a portion of the channel bandwidth that is not occupied by the packet bandwidth in accordance with a determination that contention was won on the first link including the first subchannel.

In some examples, the AP MLD and the STA MLD may each include a baseband processor, such as a PHY layer baseband processor, as discussed herein. The AP MLD may, in some examples, assign separate lower MAC layers and addresses to the first link associated with the first subchannel 904 and the second link associated with the second subchannel 906. The AP of the AP MLD assigned to the first link may be assigned a first lower MAC layer and address, and the second AP assigned to the second link may be assigned a second lower MAC layer and address different from the first lower MAC layer and address. In some examples, the AP MLD may maintain a single lower MAC layer on the baseband processor for the first and second APs, but may advertise different MAC addresses in beacon and management frames transmitted on the first link associated with the first subchannel 904 and the second link associated with the second subchannel 906, respectively. In some examples, the first link associated with the first subchannel 904 may be referred to as a primary link and the second link associated with the second subchannel 906 may be referred to as a secondary link. In some examples, the STA MLD may use a single lower MAC layer and address for the first link associated with the first subchannel 904 and the second link associated with the second subchannel 906, but may assign separate sets of rings, such as first in/first out (FIFO) queue or buffer interfaces between software and hardware of the STA MLD, and contention engines, such as backoff engines, to each of the links. In some examples, the separate lower MAC layers and addresses may be associated with separate NAVs and backoff counters associated with each link.

In association with reception of the buffers status report trigger frame, the STA MLD may transmit and the AP MLD may receive a buffer status report 918 on the first link. In association with reception of the buffer status report 918, the AP MLD may transmit a clear-to-send-to-self message 920 and a downlink packet 922, such as a downlink PPDU on the first link. In association with reception of the downlink packet 922, the STA MLD may transmit and the AP MLD may receive a block acknowledgement 924. At time 926, when the block acknowledgement is received, the AP MLD and STA MLD may resume monitoring the second link associated with the second subchannel 906 for packet transmission and/or performing independent simultaneous contention on the first subchannel 904 and the second subchannel 906. In some examples, the AP MLD and/or STA MLD may, after time 926, transmit a request-to-send (RTS) on the second subchannel 906 and/or wait for a duration of one PPDU, before monitoring and/or engaging in contention on the second link. Thus, both the AP MLD having the first single radio including the first set of RF chains 902 and the STA MLD having the second single radio including the second set of RF chains 928 may, using a single respective radio, perform simultaneous independent contention on two or more links associated with respective subchannels of a channel associated with a frequency band, such as two or more subchannels designated as primary subchannels.

Figure 9B:
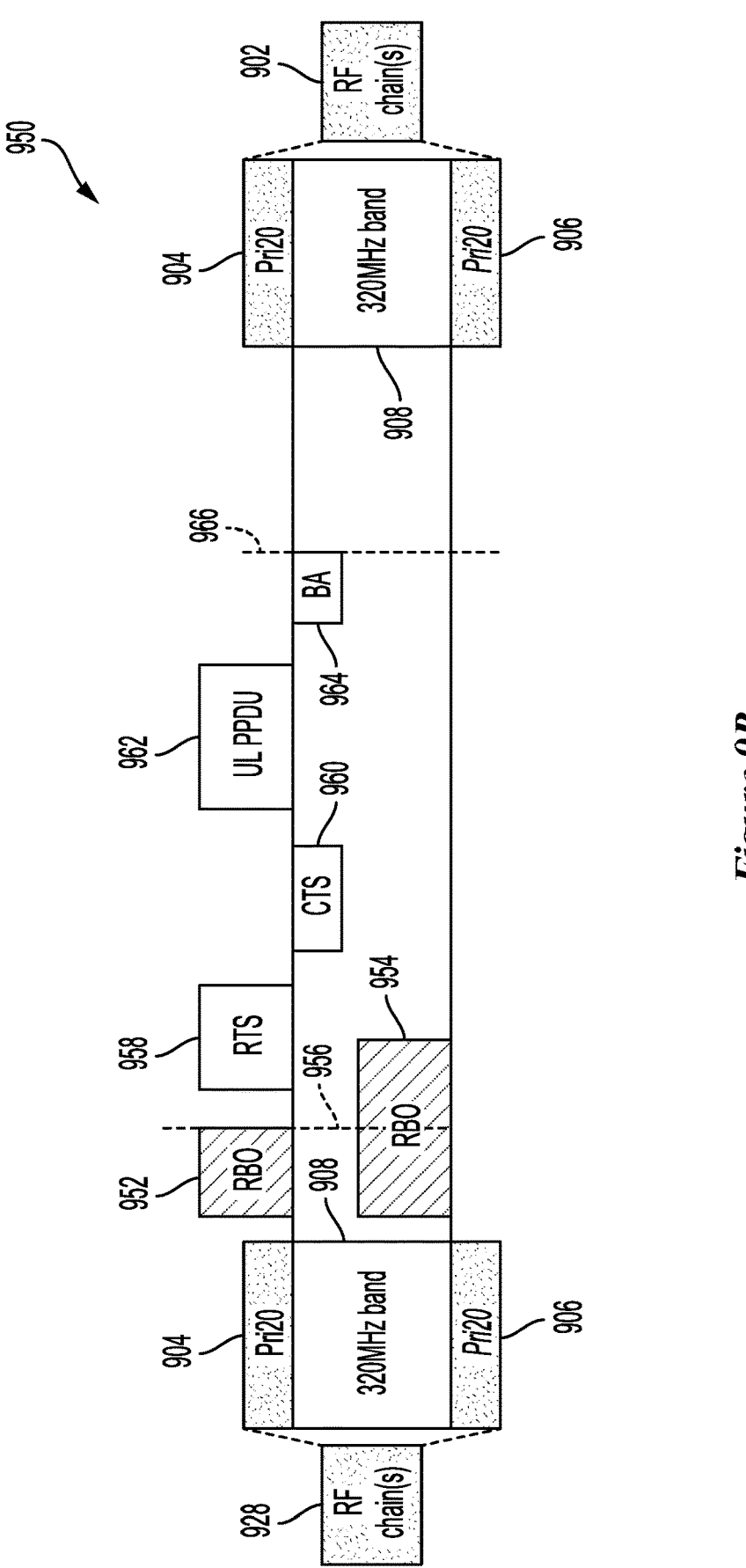
FIG. 9B shows an example packet exchange between a non-AP MLD and an AP MLD that support intra-band eMLSR communication.

FIG. 9B shows an example packet exchange between a STA MLD and an AP MLD that support intra-band eMLSR communication. The packet exchange 950 may, for example, be similar to the packet exchange 900 of FIG. 9A. The STA MLD may, using the first single radio including the second set of one or more RF chains 928, independently contend on a first link, associated with the first subchannel 904, and a second link, associated with the second subchannel 906. Independent contention may, for example, include simultaneously monitoring the first link, such as monitoring the first subchannel 904, for packet transmission using a first packet detector and the second link, such as the second subchannel 906, for packet transmission using a second packet detector. Independent contention may, alternatively or additionally, include performing a first independent random back-off (RBO) procedure on the first link and a second independent RBO procedure on the second link. For example, the STA MLD may run an independent back-off counter for each of the first link, such as for the first subchannel 904, and the second link, such as for the subchannel 906. When the STA MLD wins contention on the first link at 956, the STA MLD may transmit a packet to the AP MLD on the first link associated with the first subchannel 904, such as a request-to-send 958. The AP MLD may detect the packet transmitted on the first link associated with the first subchannel 904 and may refrain from decoding packets received on the second link associated with the second subchannel 906. In some examples, the AP MLD may designate the second subchannel 906 as a secondary 20 MHz channel in accordance with receipt of the packet. The STA MLD may be unable to detect or receive packets on the second link associated with the second subchannel 906 after contention is won on the first link associated with the first subchannel 904. The STA MLD may also designate the second subchannel 906 as a secondary 20 MHz channel after contention is won on the first link associated with the first subchannel 904.

When contention is won on the first link associated with the first subchannel 904, the STA MLD and the AP MLD may transmit and/or receive one or more packets. For example, the STA MLD may transmit and the AP MLD may receive a request-to-send 958. A bandwidth assigned to the first link including the first subchannel 904 for packet transmission after contention is won may be all or a portion of the channel 908. For example, the bandwidth assigned to the first link for packet transmission after contention is won may be a contiguous 160 MHz bandwidth of a 320 MHz bandwidth of the channel 908, may include the first subchannel 904, and may be referred to as a packet bandwidth as discussed herein. The request-to-send 958 may, for example, be a low-rate request-to-send and may span the packet bandwidth. The AP MLD may receive the request-to-send 958 and may transmit a clear-to-send 960 in accordance with receipt of the request-to-send 958. The clear-to-send 960 may likewise be a low-rate clear-to-send and may span the packet bandwidth. The STA MLD may receive the clear-to-send 960 and may transmit an uplink data packet 962, such as an uplink PPDU. The AP MLD may receive the uplink data packet 962 and may transmit a block acknowledgement 964, which may be received by the STA MLD at time 966. The STA MLD and/or the AP MLD may wait for a duration of one PPDU and/or transmit a request-to-send before monitoring and/or engaging in contention on the second link following transmission or receipt of the block acknowledgement 964.

Figure 10:
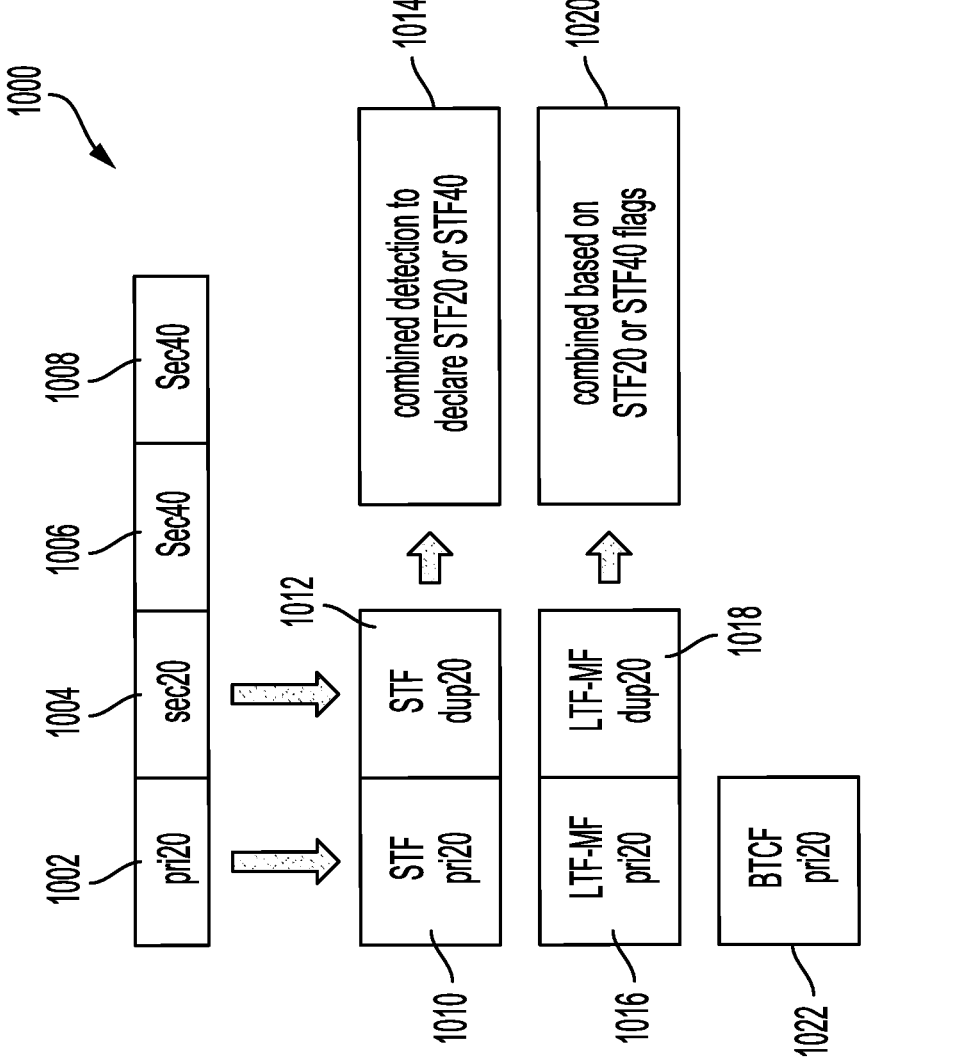
FIG. 10 shows a block diagram of an example packet detector of a wireless communication device that supports inter-band eMLSR communication.

In performing inter-band eMLSR, a wireless device, such as an AP MLD or a STA MLD, may perform packet detection on a single primary 20 MHz subchannel of a channel associated with a frequency band. FIG. 10 shows a block diagram 1000 of an example packet detector of a wireless communication device that supports inter-band eMLSR communication. A frequency band may be divided into multiple channels, such as multiple 160 MHz channels or 320 MHz channels. Channels may be divided into multiple subchannels, such as a primary 20 MHz subchannel 1002, a secondary 20 MHZ subchannel, a first secondary 40 MHz subchannel 1006, a second secondary 40 MHZ subchannel 1008, and other subchannels. Packet detection may be performed on the primary 20 MHz subchannel 1002, while energy detection may be performed on the one or more secondary subchannels 1004, 1006, 1008. For example, a packet detector may monitor the primary 20 MHz subchannel 1002 and an adjacent secondary 20 MHZ subchannel 1004 to detect when a short training field (STF) is received on both the primary 20 MHz subchannel 1002 and the secondary 20 MHz subchannel 1004. As one example, a packet transmitted on the primary 20 MHz subchannel 1002 and a packet transmitted on the secondary 20 MHz subchannel 1004 may include the same information. Thus, reception of the packet on both channels may improve a signal-to-noise ratio (SNR) for packet detection. The packet detector may, at 1014, perform combined detection for an STF 1010 on the primary 20 MHZ subchannel 1002 and an STF 1012 on the secondary 20 MHZ subchannel 1004. At 1020, the packet detector may monitor for a 20 MHz long training field (LTF) 1016 transmitted on the primary 20 MHz subchannel 1002 and a second 20 MHz LTF 1018 transmitted on the secondary 20 MHz subchannel 1004. Such monitoring may, for example, be performed in response to setting a flag based on the STFs 1010, 1012 detected on the primary 20 MHZ subchannel 1002 and the secondary 20 MHz subchannel 1004 at block 1014. The first packet detector may then, at block 1022, perform a burst timing cost function (BTCF) on the primary 20 MHz subchannel 1002.

Figure 11:
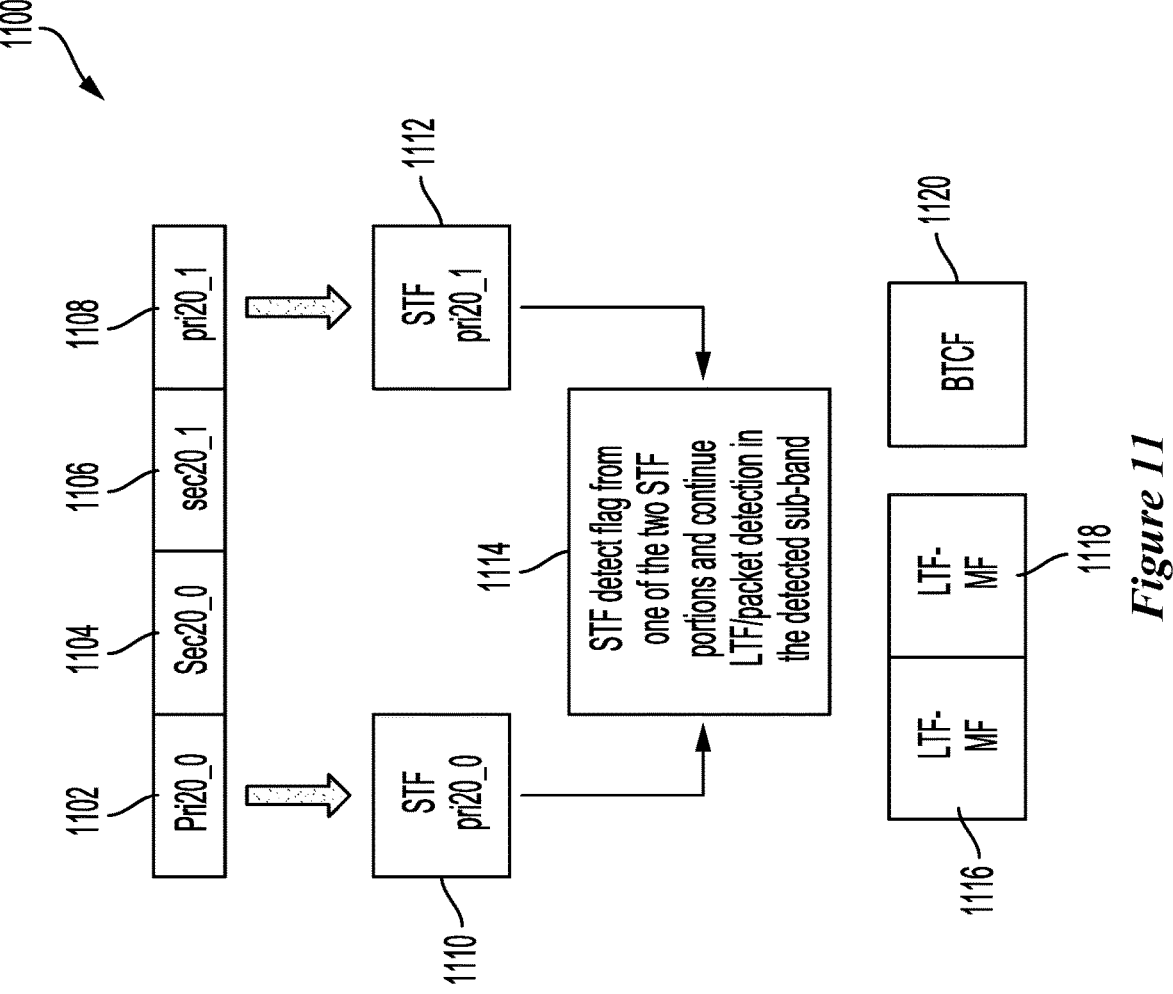
FIG. 11 shows a block diagram of an example packet detector of a wireless communication device that supports intra-band eMLSR communication.

In performing intra-band eMLSR, a wireless device, such as an AP MLD or a STA MLD, perform packet detection on multiple primary 20 MHz subchannels of a channel associated with a frequency band, using a single radio. FIG. 11 shows a block diagram 1100 of an example packet detector of a wireless communication device that supports intra-band eMLSR communication. A channel may include a first 20 MHz subchannel designated as a first primary 20 MHz channel 1102, a second 20 MHZ subchannel designated as a first secondary 20 MHz subchannel 1104, a third 20 MHZ subchannel designated as a second secondary 20 MHz subchannel 1106, a fourth 20 MHz subchannel designated as a second primary 20 MHz subchannel 1108, and other subchannels. A first packet detector may, at block 1110, monitor for an STF of a packet transmitted on the first primary 20 MHz subchannel 1102, and a second packet detector may, at block 1112, monitor for an STF of a packet transmitted on the second primary 20 MHz subchannel 1108. At block 1114, a packet may be first detected on one of the two primary 20 MHz subchannels 1102, 1108. For example, an STF of a packet may be first detected on one of the two primary 20 MHz subchannels 1102, 1108. The packet detectors may then focus on the primary 20 MHz subchannel on which the STF was detected and may, at alternate blocks 1116, 1118, perform LTF detection on the subchannel on which the STF was detected. The first and second packet detectors may, for example, operate as part of simultaneous independent contention operations performed on each of the primary 20 MHz subchannels 1102, 1108. For example, packet detection may be performed by a receiving AP MLD or STA MLD to detect a packet on a link indicating contention is won on the link by a transmitting AP MLD or STA MLD, while packet detection may be performed by a transmitting AP MLD or STA MLD to detect a packet on a link indication contention is lost on the link. When an LTF is detected on the channel, the packet detectors may perform a BTCF 1120 on the primary 20 MHz subchannel on which the LTF was detected.

FIG. 12 shows a flowchart illustrating an example process 1200 performable at a wireless communication device that supports intra-band eMLSR communication. The operations of the process 1200 may be implemented by a wireless communication device or its components as described herein. For example, the process 1200 may be performed by a first wireless communication device, such as the wireless communication device 800 described with reference to FIG. 8, operating as or within a wireless AP or STA, or the wireless communication device 1400 described with reference to FIG. 14, operating as or within a wireless AP or STA. In some examples, the process 1200 may be performed by a wireless AP such as one of the APs 102 or by a wireless STA such as one of the STAs 104 described with reference to FIG. 1.

In some examples, in block 1202, the first wireless communication device may independently contend, using a single radio, for access on each of a first link associated with a first primary subchannel of a first channel and a second link associated with a second primary subchannel of the first channel. The single radio may, for example, include a single RF chain or may include multiple RF chains. Independently contending for access on each of the first link and the second link may, for example, include independently monitoring for a packet on each of the first and second primary subchannels. Such monitoring may, for example, be performed by first and second packet detectors which may be physically distinct, or may be virtually distinct sharing one or more components. The first and second packet detectors may, for example, be first and second packet detectors of a baseband processor of the wireless communication device. In some examples, the first channel may be a 320 MHz channel associated with a frequency band, the first primary subchannel may be a first primary 20 MHz channel, and the second primary subchannel may be a second primary 20 MHz subchannel. For example, the first channel may be a 320 MHz channel, the first primary subchannel may be a first primary 20 MHz subchannel in a first half of the 320 MHz channel, such as in a first 160 MHz subchannel of the 320 MHz channel, and the second primary subchannel may be a second primary 20 MHz subchannel in a second half of the 320 MHz channel, such as in a second 160 MHz subchannel of the 320 MHz channel that does not overlap with the first 160 MHz subchannel of the 320 MHz channel. Alternatively or additionally, independently contending for access on each of the first and second links may include running a respective independent back-off counter for each of the first link and the second link. In some examples, the single radio may include a single PHY layer associated with both the first link and the second link, while in other examples the single radio may include a first PHY layer associated with the first link and a second, different, PHY layer associated with the second link. In some examples, the single radio may include a single synthesizer, which may be a single oscillator. In some examples, the first wireless communication device may include a NAV associated with each link, and a lower MAC layer associated with each link may implement the NAV and back-off counters associated with the respective links. In some examples, different RF chains may be associated with each link on each primary subchannel.

In block 1204, the first wireless communication device may transmit, using the single radio, a first packet to a second wireless communication device over a one of the first link or the second link on which the contention is won. Contention may be won, for example, when an independent back-off counter run for a link first expires before receipt of a packet on the link associated with the back-off counter. In some examples, upon winning contention on either the first or the second link, the first wireless communication device may transfer one or more RF chains associated with the link on which contention was not won to the link on which contention is won, and may use the transferred one or more RF chains, along with RF chains previously assigned to the link on which contention as won, to communicate on resources associated with the link on which contention is won, such as to transmit the first packet. If the first wireless communication device is an AP, such as an AP of an AP MLD, the packet may include a downlink PPDU, a BSRP trigger frame, or another packet. If the first wireless communication device is a non-AP STA, such as a non-AP STA of a non-AP STA MLD, the packet may include an uplink PPDU, an RTS, or another packet. In some examples, after winning contention, the wireless communication device may be unable to receive packets transmitted on and/or monitor the link on which contention is not won as the wireless device may be transmitting and/or receiving on the first link. Alternatively or additionally, the wireless communication device may detect packets received on the link on which contention is not won, but may refrain from decoding such packets.

In some examples, the packet transmitted at block 1204 may be transmitted on a portion of the channel allocated for the packet transmission, such as a portion of the channel allocated to a first link associated with the first subchannel. For example, the portion of the channel allocated for the packet transmission may be less than a bandwidth of the channel or may be equal to the bandwidth of the channel. In some examples, the portion of the channel allocated for packet transmission on the first link when contention is won on the first link may be 160 MHz of a 320 MHz channel. The allocated 160 MHz may be contiguous and may include the first primary subchannel associated with the first link. In examples where the portion of the channel allocated for the packet transmission is less than the total channel bandwidth, the second wireless communication device may refrain from decoding one or more additional packets detected on the link on which contention is not won, such as on at least the primary subchannel associated with the link which contention is not won, and, in some examples, on the entire portion of the channel that is not allocated for the packet transmission on the link on which contention is won.

In some examples, such as when the first wireless communication device is a first AP or a component within a first AP and when the second wireless communication device is a first STA or a component within a first STA, the first wireless communication device may transmit a first BSRP trigger frame to the first STA, receive a buffer status report from the first STA in association with transmission of the BSRP trigger frame to the first STA, transmit a clear-to-send-to-self transmission to the first STA after receiving the buffer status report, and transmit a downlink data PPDU to the first STA after transmitting the clear-to-send-to-self transmission. Likewise, in some examples, such as when the first wireless communication device is a first STA or a component within a first STA and when the second wireless communication device is a first AP or a component within a first AP, the first wireless communication device may transmit a first RTS to the first AP, receive a clear-to-send from the first AP in association with transmitting the first RTS, and transmit an uplink data PPDU to the first AP after receiving the clear-to-send.

In some examples, the second wireless communication device may determine that contention is won by the first wireless communication device based on receipt of the first packet. Receipt of the first packet may, for example, include detection of the first packet. For example, the second wireless communication device may determine that contention is won by the first wireless communication device on a link on which the first packet is received. For example, if the second wireless communication device is a STA, the second wireless communication device may determine contention is won by the first wireless communication device on a link based on receipt of a BSRP trigger frame on the link. The second wireless communication device may transfer one or more RF chains associated with the link on which contention was not won to the link on which contention is won, and may use the transferred RF chains and RF chains already allocated to the link on which contention is won to communicate on resources associated with the link on which contention is won, such as to transmit or receive one or more packets. Detection of the packet by the second wireless communication device may, for example, include detection of a PHY preamble of a packet on the first primary subchannel or the second primary subchannel. For example, such detection may include detection of an LTF and/or an STF on either the first primary subchannel or the second primary subchannel. In some examples, the second wireless communication device may be configured to prioritize packet detection on either the first primary subchannel or the second primary subchannel to resolve conflicts, such as conflicts that may arise when a same packet is detected at a same time on both primary subchannels. For example, packet detection may be staggered, such that packet detection logic performed on a signal received on one primary subchannel begins an amount of time after packet detection logic performed on the signal received on the other primary subchannel. As another example, one primary subchannel may be given priority over the other primary subchannel when a packet is detected on both primary subchannels at a same time. Thus, for example, if a same packet is detected on multiple primary subchannels, a primary subchannel on which the packet is first detected may be given priority. If the packet is detected at a same time on multiple primary subchannels, a designated primary subchannel may be given priority over the other primary subchannel(s). In some examples, when a first packet detector detects a packet, such as when a first packet detector initiates a packet detection process on a received signal, a second packet detector, and other packet detector (s), may be disabled. For example, the other packet detector (s) may be configured to ignore power surges and drops that may be caused by reception of packets on other channels while packet detection logic is being performed by the first packet detector. Similar packet detection operations may also be performed by the first wireless communication device.

In some examples, the first wireless communication device may be a first AP MLD, which may include a first AP assigned to a link associated with the first primary subchannel and a second AP assigned to a link associated with the second primary subchannel. For example, the first AP may be assigned to a first half of the first channel and the second AP may be assigned to a second half of the first channel. In such examples, packet transmission, such as the packet transmission of block 1204, may be performed on at least the first half of the first channel when contention is won on the first link associated with the first primary subchannel and on at least the second half of the channel when contention is won on the second link associated with the second primary subchannel. In some examples, the first AP may be configured to transmit packets to and receive packets from only STAs configured for intra-band eMLSR operation and the second AP may be configured to transmit packets to and receive packets from STAs that are configured for intra-band eMLSR operation and STAs that are not configured for intra-band eMLSR operation. In some examples, the first AP may be configured to broadcast a first beacon on the first link, and the second AP may be configured to broadcast a second beacon on the second link. Such broadcasting may, for example, be performed as part of performing contention operations on the first link and the second link. In some examples, the first AP may be associated with a first lower MAC layer and address, and the second AP may be associated with a second, different, lower MAC layer and address, and such lower MAC addresses may be used by the respective APs in broadcasting beacons on the respective first and second links. In some examples the first MAC layer and address may be associated with a first back-off counter, and the second MAC layer and address may be associated with a second back-off counter. In some examples, a single MAC layer and address may be assigned to all respective links and APs.

In some examples, the first wireless communication device described with respect to the process 1200 may be a first STA MLD or component within the first STA MLD. In some examples, the first STA MLD may be associated with a single LMAC address. Furthermore, a first buffer, such as a first ring, and a first contention engine of the first STA MLD may be associated with the first link, and a second buffer, such as a second ring, and a second contention engine of the first STA MLD may be associated with the second link. In some examples, AP and STA MLDs including multiple radios may also be capable of supporting intra-band eMLSR as discussed herein.

FIG. 13 shows a flowchart illustrating an example process 1300 performable at a wireless communication device that supports intra-band eMLSR communication. The operations of the process 1300 may be implemented by a wireless communication device or its components as described herein. For example, the process 1300 may be performed by a wireless communication device, such as the wireless communication device 800 described with reference to FIG. 8, operating as or within a wireless AP or STA, or the wireless communication device 1400 described with reference to FIG. 14, operating as or within a wireless AP or STA. In some examples, the process 1300 may be performed by a wireless AP such as one of the APs 102 or by a wireless STA such as one of the STAs 104 described with reference to FIG. 1. In some examples, one or more blocks of the process 1300 may be performed along with one or more blocks of the process 1200.

In some examples, in block 1302, the wireless communication device may perform energy detection on a third subchannel of the channel in accordance with contention being won on one of the first and second subchannel. For example, the third subchannel may be a subchannel of a portion of the channel allocated to a link on which contention was won, as described with respect to the process 1200 of FIG. 12. In some examples, a threshold for energy detection on the third subchannel may be lower than a threshold for packet detection. In some examples, such energy detection may be performed after winning contention on a respective link. In some examples, the third subchannel may be the subchannel of the first subchannel and the second subchannel associated with the link on which contention was not won in the process 1200. For example, if contention is not won on a link associated with a second subchannel, the second subchannel may be designated as a secondary 20 MHz subchannel, and energy detection may be performed on the second subchannel. Thus, the third subchannel may be a secondary 20 MHz subchannel of the first channel. Transmission and/or reception of one or more packets on a link on which contention is won, such as described herein, may be performed in accordance with energy detection performed on the third subchannel. For example, if energy detected on the third subchannel is above a predetermined threshold, the first wireless communication device may refrain from transmitting and/or receiving packets on at least the third subchannel.

At block 1304, the wireless communication device may refrain from decoding one or more additional packets detected on the one of the first link or the second link on which contention was not won. In some examples, the wireless communication device may refrain from decoding packets received on all frequencies of the channel described with respect to the process 1200 that are not associated with a link on which contention was won, such as all of a channel bandwidth outside of a packet bandwidth. In some embodiments, the wireless communication device may be unable to detect packets received on the one of the first or the second link on which contention was not won.

At block 1306, the wireless communication device may transmit a request-to-send on the one of the first link or the second link on which contention was not won after transmitting the first packet. For example, such transmission may be performed after transmission of the packet as described with respect to block 1204. Alternatively or additionally, the wireless communication device may wait a duration of a PPDU before transmitting on, such as performing contention on, a link on which contention as not won.

Figure 14:
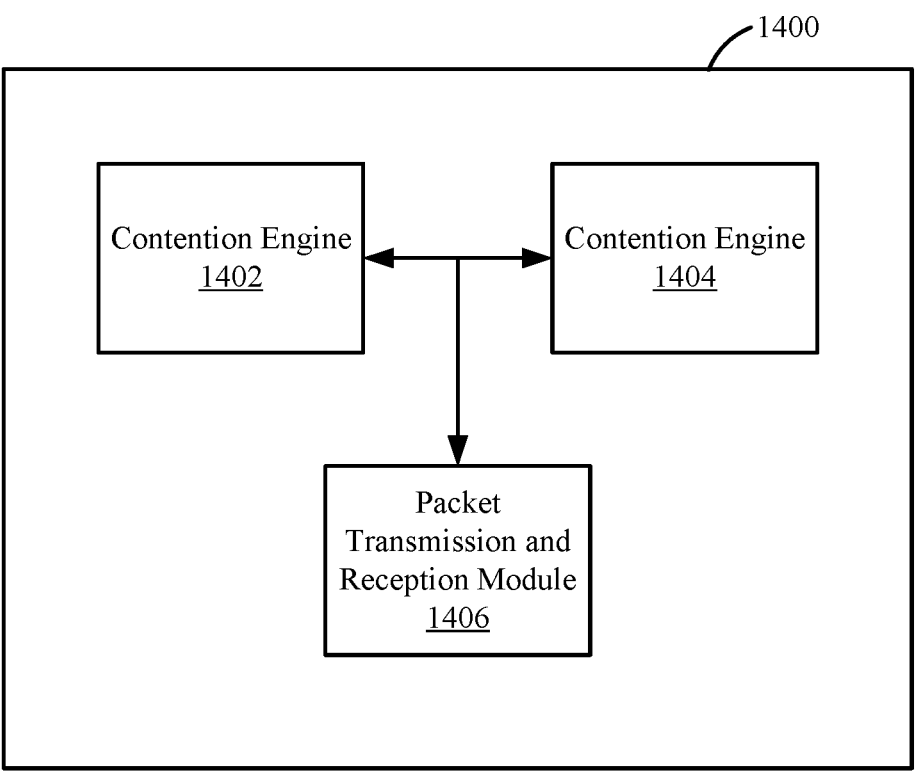
FIG. 14 shows a block diagram of an example wireless communication device that supports intra-band eMLSR communication.

FIG. 14 shows a block diagram of an example wireless communication device 1400 that supports intra-band eMLSR communication. In some examples, the wireless communication device 1400 is configured or operable to perform the process 1200 described with reference to FIG. 12 and/or the process 1300 described with reference to FIG. 13. In various examples, the wireless communication device 1400 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 1400 can be a device for use in an AP, such as AP 102 described with reference to FIG. 1. In some examples, the wireless communication device 1400 can be a device for use in a STA, such as STA 104 described with reference to FIG. 1. In some other examples, the wireless communication device 1400 can be an AP or STA that includes such a chip, SoC, chipset, package or device as well as multiple antennas. The wireless communication device 1400 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1400 also includes or can be coupled with an application processor which may be further coupled with another memory. In some examples, the wireless communication device 1400 further includes one or more external network interfaces that enables communication with a core network or backhaul network to gain access to external networks including the Internet.

The wireless communication device 1400 includes a first contention engine component 1402, a second contention engine component 1404, and a packet transmission and reception module component 1406. Portions of one or more of the components 1402, 1404, and 1406 may be implemented at least in part in hardware or firmware. For example, the packet transmission and reception module component 1406 may be implemented at least in part by a modem. In some examples, at least some of the components 1402, 1404, and 1406 are implemented at least in part by a processor and as software stored in a memory. For example, portions of one or more of the components 1402, 1404, and 1406 can be implemented as non-transitory instructions (or "code") executable by the processor to perform the functions or operations of the respective module.

In some implementations, a processor may be a component of a processing system. A processing system may generally refer to a system or series of machines or components that receives inputs and processes the inputs to produce a set of outputs (which may be passed to other systems or components of, for example, the device 1400). For example, a processing system of the device 1400 may refer to a system including the various other components or subcomponents of the device 1400, such as the processor, or a transceiver, or a communications manager, or other components or combinations of components of the device 1400. The processing system of the device 1400 may interface with other components of the device 1400, and may process information received from other components (such as inputs or signals) or output information to other components. For example, a chip or modem of the device 1400 may include a processing system, a first interface to output information and a second interface to obtain information. In some implementations, the first interface may refer to an interface between the processing system of the chip or modem and a transmitter, such that the device 1400 may transmit information output from the chip or modem. In some implementations, the second interface may refer to an interface between the processing system of the chip or modem and a receiver, such that the device 1400 may obtain information or signal inputs, and the information may be passed to the processing system. A person having ordinary skill in the art will readily recognize that the first interface also may obtain information or signal inputs, and the second interface also may output information or signal outputs.

The first contention engine component 1402 is capable of, configured to, or operable to perform independent contention for access on a first link associated with a first subchannel of a channel as discussed herein. For example, the first contention engine 1402 may be configured to independently monitor for a packet transmitted on the first link associated with the first channel. In some examples, the first contention engine 1402 may include an independent packet detector for performing such monitoring. The first contention engine 1402 may be further configured to run an independent back-off counter for the first link associated with the first channel.

The second contention engine component 1404 is capable of, configured to, or operable to perform independent contention for access on a second link associated with a second subchannel of a channel as discussed herein. For example, the second contention engine 1404 may be configured to independently monitor for a packet transmitted on the second link associated with the second channel. In some examples, the second contention engine 1404 may include an independent packet detector for performing such monitoring. The second contention engine 1404 may be further configured to run an independent back-off counter for the second link associated with the second channel.

The first contention engine 1402 and the second contention engine 1404 may, for example, be included in a baseband processor of the wireless communication device 1400. In some examples, the first contention engine 1402 and the second contention engine 1404 may be physically distinct within the baseband processor, while in other examples the first contention engine 1402 and the second contention engine 1404 may be virtually distinct, sharing one or more physical components within the baseband processor.

The packet transmission and reception module component 1406 is capable of, configured to, or operable to perform a packet transmission and reception with a second wireless communication device on at least the one of the first link or the second link on which contention is won.

Implementation examples are described in the following numbered clauses:

1. A method for wireless communication by a first wireless communication device, including: independently contending, using a single radio, for access on each of a first link associated with a first primary subchannel of a first channel and a second link associated with a second primary subchannel of the first channel; and transmitting, using the single radio, a first packet to a second wireless communication device over a one of the first link or the second link on which the contention is won.

2. The method of clause 1, where independently contending for access on each of the first link and the second link includes independently monitoring for a second packet on each of the first primary subchannel and the second primary subchannel.

3. The method of clause 1, where independently contending for access on each of the first link and the second link includes running a respective independent back-off counter for each of the first link and the second link.

4. The method of clause 1, where the single radio includes one or more radio frequency (RF) chains.

5. The method of clause 1, where the single radio includes a single physical (PHY) layer associated with both the first link and the second link.

6. The method of clause 1, where the single radio includes a first physical (PHY) layer associated with the first link and a different second PHY layer associated with the second link.

7. The method of clause 1, where the first wireless communication device includes a first lower media access control (MAC) layer having a first MAC address and a second lower MAC layer having a second MAC address.

8. The method of clause 7, where the first lower MAC layer is associated with a first back-off counter and the second lower MAC layer is associated with a different second back-off counter.

9. The method of clause 1, where the single radio includes a single synthesizer.

10. The method of clause 1, where the first channel is a 320 MHz channel, the first primary subchannel is a first 20 MHz subchannel in a first 160 MHz subchannel of the 320 MHz channel, and the second primary subchannel is a second 20 MHz subchannel in a different second 160 MHz subchannel of the 320 MHz channel.

11. The method of clause 1, further including: refraining from decoding one or more additional packets detected on the one of the first primary subchannel or the second primary subchannel associated with the link on which the contention was not won.

12. The method of clause 1, where the first wireless communication device is a first access point (AP) multi-link device (MLD) or component within the first AP MLD, the first AP MLD including a first AP associated with the first link and a second AP associated with the second link.

13. The method of clause 12, where the first AP is configured transmit the first packet only to stations (STAs) configured for intra-band enhanced multilink single-radio (eMLSR) operation and the second AP is configured to transmit the first packet to either or both of STAs that are configured for intra-band eMLSR operation and STAs that are not configured for intra-band eMLSR operation.

14. A first wireless communication device, including: one or more memories storing processor-executable code; and one or more processors coupled with the one or more memories and individually or collectively configured to, when executing the code, cause the first wireless communication device to: independently contend, using a single radio, for access on each of a first link associated with a first primary subchannel of a first channel and a second link associated with a second primary subchannel of the first channel; and transmit, using the single radio, a first packet to a second wireless communication device over a one of the first link or the second link on which the contention is won.

15. The first wireless communication device of clause 14, where independently contending for access on each of the first link and the second link includes independently monitoring for a second packet on each of the first primary subchannel and the second primary subchannel.

16. The first wireless communication device of clause 14, where independently contending for access on each of the first link and the second link includes running a respective independent back-off counter for each of the first link and the second link.

17. The first wireless communication device of claim 14, where the single radio includes one or more radio frequency (RF) chains.

18. The first wireless communication device of clause 14, where the single radio includes a single physical (PHY) layer associated with both the first link and the second link.

19. The first wireless communication device of clause 14, where the single radio includes a first physical (PHY) layer associated with the first link and a different second PHY layer associated with the second link.

20. The first wireless communication device of clause 14, where the first wireless communication device includes a first lower media access control (MAC) layer having a first MAC address and a second lower MAC layer having a second MAC address.

21. The first wireless communication device of clause 20, where the first lower MAC layer is associated with a first back-off counter and the second lower MAC layer is associated with a different second back-off counter.

22. The first wireless communication device of clause 14, where the single radio includes a single synthesizer.

23. The first wireless communication device of clause 14, where the first channel is a 320 MHz channel, the first primary subchannel is a first 20 MHz subchannel in a first 160 MHz subchannel of the 320 MHz channel, and the second primary subchannel is a second 20 MHz subchannel in a different second 160 MHz subchannel of the 320 MHz channel.

24. The first wireless communication device of clause 14, where the one or more processors are further individually or collectively operative to: refrain from decoding one or more additional packets detected on the one of the first primary subchannel or the second primary subchannel associated with the link on which the contention was not won.

25. The first wireless communication device of clause 14, where the first wireless communication device is a first access point (AP) multi-link device (MLD) or component within the first AP MLD, the first AP MLD including a first AP associated with the first link and a second AP associated with the second link.

26. The first wireless communication device of clause 25, where the first AP is configured transmit the first packet only to stations (STAs) configured for intra-band enhanced multilink single-radio (eMLSR) operation and the second AP is configured to transmit the first packet to either or both of STAs that are configured for intra-band eMLSR operation and STAs that are not configured for intra-band eMLSR operation.

27. A first wireless communication device, including: means for independently contending, using a single radio, for access on each of a first link associated with a first primary subchannel of a first channel and a second link associated with a second primary subchannel of the first channel; and means for transmitting, using the single radio, a first packet to a second wireless communication device over a one of the first link or the second link on which the contention is won.

28. The first wireless communication device of clause 27, where independently contending for access on each of the first link and the second link includes independently monitoring for a second packet on each of the first primary subchannel and the second primary subchannel.

29. The first wireless communication device of clause 27, where independently contending for access on each of the first link and the second link includes running a respective independent back-off counter for each of the first link and the second link.

30. The first wireless communication device of clause 14, where the single radio includes one or more radio frequency (RF) chains.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method for wireless communication by a first wireless communication device, comprising:
independently contending concurrently, using a single radio, for access on each of a first link associated with a first primary subchannel of a first channel and a second link associated with a second primary subchannel of the first channel; and
transmitting, using the single radio, a first packet to a second wireless communication device over a one of the first link or the second link on which the contention is won.

2. The method of claim 1, wherein independently contending concurrently for access on each of the first link and the second link comprises independently monitoring for a second packet on each of the first primary subchannel and the second primary subchannel.

3. The method of claim 1, wherein independently contending concurrently for access on each of the first link and the second link comprises running a respective independent back-off counter for each of the first link and the second link.

4. The method of claim 1, wherein the single radio includes one or more radio frequency (RF) chains.

5. The method of claim 1, wherein the single radio includes a single physical (PHY) layer associated with both the first link and the second link.

6. The method of claim 1, wherein the single radio includes a first physical (PHY) layer associated with the first link and a different second PHY layer associated with the second link.

7. The method of claim 1, wherein the first wireless communication device includes a first lower media access control (MAC) layer having a first MAC address and a second lower MAC layer having a second MAC address.

8. The method of claim 7, wherein the first lower MAC layer is associated with a first back-off counter and the second lower MAC layer is associated with a different second back-off counter.

9. The method of claim 1, wherein the single radio includes a single synthesizer.

10. The method of claim 1, wherein the first channel is a 320 MHz channel, the first primary subchannel is a first 20 MHz subchannel in a first 160 MHz subchannel of the 320 MHz channel, and the second primary subchannel is a second 20 MHz subchannel in a different second 160 MHz subchannel of the 320 MHz channel.

11. The method of claim 1, further comprising:
refraining from decoding one or more additional packets detected on the one of the first primary subchannel or the second primary subchannel associated with the link on which the contention was not won.

12. The method of claim 1, wherein the first wireless communication device is a first access point (AP) multi-link device (MLD) or component within the first AP MLD, the first AP MLD comprising a first AP associated with the first link and a second AP associated with the second link.

13. The method of claim 12, wherein the first AP is configured transmit the first packet only to stations (STAs) configured for intra-band enhanced multilink single-radio (eMLSR) operation and the second AP is configured to transmit the first packet to either or both of STAs that are configured for intra-band eMLSR operation and STAs that are not configured for intra-band eMLSR operation.

14. A first wireless communication device, comprising:
one or more memories storing processor-executable code; and
one or more processors coupled with the one or more memories and individually or collectively configured to, when executing the code, cause the first wireless communication device to:
independently contend concurrently, using a single radio, for access on each of a first link associated with a first primary subchannel of a first channel and a second link associated with a second primary subchannel of the first channel; and
transmit, using the single radio, a first packet to a second wireless communication device over a one of the first link or the second link on which the contention is won.

15. The first wireless communication device of claim 14, wherein independently contending concurrently for access on each of the first link and the second link comprises independently monitoring for a second packet on each of the first primary subchannel and the second primary subchannel.

16. The first wireless communication device of claim 14, wherein independently contending concurrently for access on each of the first link and the second link comprises running a respective independent back-off counter for each of the first link and the second link.

17. The first wireless communication device of claim 14, wherein the single radio includes one or more radio frequency (RF) chains.

18. The first wireless communication device of claim 14, wherein the single radio includes a single physical (PHY) layer associated with both the first link and the second link.

19. The first wireless communication device of claim 14, wherein the single radio includes a first physical (PHY) layer associated with the first link and a different second PHY layer associated with the second link.

20. The first wireless communication device of claim 14, wherein the first wireless communication device includes a first lower media access control (MAC) layer having a first MAC address and a second lower MAC layer having a second MAC address.

21. The first wireless communication device of claim 20, wherein the first lower MAC layer is associated with a first back-off counter and the second lower MAC layer is associated with a different second back-off counter.

22. The first wireless communication device of claim 14, wherein the single radio includes a single synthesizer.

23. The first wireless communication device of claim 14, wherein the first channel is a 320 MHz channel, the first primary subchannel is a first 20 MHz subchannel in a first 160 MHz subchannel of the 320 MHz channel, and the second primary subchannel is a second 20 MHz subchannel in a different second 160 MHz subchannel of the 320 MHz channel.

24. The first wireless communication device of claim 14, wherein the one or more processors are further individually or collectively operative to:
refrain from decoding one or more additional packets detected on the one of the first primary subchannel or the second primary subchannel associated with the link on which the contention was not won.

25. The first wireless communication device of claim 14, wherein the first wireless communication device is a first access point (AP) multi-link device (MLD) or component within the first AP MLD, the first AP MLD comprising a first AP associated with the first link and a second AP associated with the second link.

26. The first wireless communication device of claim 25, wherein the first AP is configured transmit the first packet only to stations (STAs) configured for intra-band enhanced multilink single-radio (eMLSR) operation and the second AP is configured to transmit the first packet to either or both of STAs that are configured for intra-band eMLSR operation and STAs that are not configured for intra-band eMLSR operation.

27. A first wireless communication device, comprising:
means for independently contending concurrently, using a single radio, for access on each of a first link associated with a first primary subchannel of a first channel and a second link associated with a second primary subchannel of the first channel; and
means for transmitting, using the single radio, a first packet to a second wireless communication device over a one of the first link or the second link on which the contention is won.

28. The first wireless communication device of claim 27, wherein independently contending concurrently for access on each of the first link and the second link comprises independently monitoring for a second packet on each of the first primary subchannel and the second primary subchannel.

29. The first wireless communication device of claim 27, wherein independently contending concurrently for access on each of the first link and the second link comprises running a respective independent back-off counter for each of the first link and the second link.

30. The first wireless communication device of claim 27, wherein the single radio includes one or more radio frequency (RF) chains.

* * * * *